(12) United States Patent  (10) Patent No.: US 8,493,408 B2
Williamson et al.  (45) Date of Patent: Jul. 23, 2013

(54) TECHNIQUES FOR MANIPULATING PANORAMAS

(75) Inventors: Richard Williamson, Los Gatos, CA (US); Christopher Blumenberg, San Francisco, CA (US); Mike Matas, San Francisco, CA (US); Kimon Tsinteris, Hillsborough, CA (US); Ryan Staake, San Francisco, CA (US); Alex Kan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1035 days.

(21) Appl. No.: 12/274,298

(22) Filed: Nov. 19, 2008

(65) Prior Publication Data

US 2010/0123737 A1 May 20, 2010

(51) Int. Cl.
 *G06T 17/05* (2011.01)
(52) U.S. Cl.
 USPC ........... 345/629; 345/173; 345/419; 345/630; 345/632; 345/633; 340/988; 340/990; 340/995.1; 701/400; 701/438; 701/468; 715/809
(58) Field of Classification Search
 USPC .................. 345/173, 419, 629–636; 340/988, 340/990, 995.1–995.24; 701/400, 438, 468; 715/809
 See application file for complete search history.

(56) References Cited

U.S. PATENT DOCUMENTS

| | | | |
|---|---|---|---|
| 5,642,106 A * | 6/1997 | Hancock et al. | 340/988 |
| 6,323,846 B1 | 11/2001 | Westerman et al. | |
| 6,492,985 B1 * | 12/2002 | Mutz et al. | 345/419 |
| 6,565,610 B1 * | 5/2003 | Wang et al. | 715/210 |
| 6,570,557 B1 | 5/2003 | Westerman et al. | |
| 6,677,932 B1 | 1/2004 | Westerman | |
| 6,888,536 B2 | 5/2005 | Westerman et al. | |
| 7,106,335 B2 * | 9/2006 | Chevallier et al. | 345/474 |
| 7,388,519 B1 * | 6/2008 | Kreft | 340/995.24 |
| 7,458,037 B2 * | 11/2008 | Fuchs et al. | 715/855 |
| 7,496,484 B2 * | 2/2009 | Agrawala et al. | 703/2 |
| 7,843,451 B2 * | 11/2010 | Lafon | 345/423 |
| 7,990,394 B2 * | 8/2011 | Vincent et al. | 345/629 |
| 2003/0011599 A1 * | 1/2003 | Du | 345/428 |

(Continued)

FOREIGN PATENT DOCUMENTS

| | | |
|---|---|---|
| JP | 2008/085488 A | 4/2008 |
| WO | WO-2010/059426 A2 | 5/2010 |
| WO | WO-2010/059426 A3 | 5/2010 |

OTHER PUBLICATIONS

Google Earth User Guide—2007; http://static.googleusercontent.com/external_content/untrusted_dlcp/earth.google.com/en/us/userguide/v4/google_earth_user_guide.pdf.*

(Continued)

*Primary Examiner* — Xiao M. Wu
*Assistant Examiner* — Todd Buttram
(74) *Attorney, Agent, or Firm* — Morrison & Foerster LLP

(57) ABSTRACT

A multi-step animation sequence for smoothly transitioning from a map view to a panorama view of a specified location is disclosed. An orientation overlay can be displayed on the panorama, showing a direction and angular extent of the field of view of the panorama. An initial specified location and a current location of the panorama can also be displayed on the orientation overlay. A navigable placeholder panorama to be displayed in place of a panorama at the specified location when panorama data is not available is disclosed. A perspective view of a street name annotation can be laid on the surface of a street in the panorama.

19 Claims, 18 Drawing Sheets

U.S. PATENT DOCUMENTS

| | | | | |
|---|---|---|---|---|
| 2006/0181519 | A1* | 8/2006 | Vernier et al. | 345/173 |
| 2007/0219706 | A1* | 9/2007 | Sheynblat | 701/200 |
| 2007/0229490 | A1* | 10/2007 | Boudreau et al. | 345/418 |
| 2007/0230824 | A1* | 10/2007 | Alvarez | 382/293 |
| 2008/0292213 | A1* | 11/2008 | Chau | 382/294 |
| 2009/0289956 | A1* | 11/2009 | Douris et al. | 345/633 |
| 2010/0017733 | A1* | 1/2010 | Barros | 715/766 |
| 2010/0030612 | A1* | 2/2010 | Kim et al. | 705/9 |
| 2010/0164702 | A1* | 7/2010 | Sasaki et al. | 340/438 |
| 2010/0171758 | A1* | 7/2010 | Maassel et al. | 345/632 |
| 2011/0131597 | A1* | 6/2011 | Cera et al. | 725/24 |

OTHER PUBLICATIONS

Google Earth for the iPhone—2008; http://googlemobile.blogspot.com/2008/10/google-earth-now-available-for-iphone.html; Oct. 27, 2008.*

European Search Report, dated Apr. 23, 2010, issued in EP Application No. EP 09 17 5705.

Fukatsu et al., "Intuitive Control of 'Bird's Eye' Overview Images for Navigation in an Enourmous Virtual Environment", Virtual Reality and Software and Technology [online] , Nov. 5, 1998, pp. 67-76, [retrieved on Mar. 24, 2010]. Retrieved from the internet: <URL: http://delivery.acm.org/10.1145/300000/293710/p67-fukatsu.pdf?key1=293710&key2=5261959621&ci11=GUIDE&CFID=81696894&CFTOKEN=41329790>.

"Panowalker". Panowalker [online]. Feb. 25, 2008. 2 pages. [retrieved on Mar. 19, 2010]. Retrieved from the Internet: <URL: http://panowalker.lastdownload.com/>.

European Authorized Officer Raoul Emme, Notification of Transmittal of the International Search Report and the Written Opinion of the International Searching Authority, or the Declaration for Application No. PCT/US2009/063253, dated Mar. 30, 2011, 24 pages.

Dr. Ing. Phisan Santitamnot, "Geo-information in the Age of Instant Access", Jan. 31, 2008, pp. 1-5, XP 002570609, Retrieved from the Internet: <URL: <http://www/gisdevelopment.net/magazine/global/2008/January/54.htm> [Retrieved on Feb. 25, 2010].

Anonymous, "Panowalker", Feb. 25, 2008, pp. 1-2, XP002625330, Retrieved from the Internet: <URL: <http://www.easypano.com/product-42_325.html> [retrieved on Feb. 28, 2011].

Anonymous. "Google Earth User Guide". Google Earth User Guide [online]. Jun. 21, 2008, pp. 1-11 [retrieved on Apr. 7, 2010]. Retrieved from the Internet: <URL: http://web.archive.org/web.20080622112016/http://earth.google.com/userguide/v4/>.

Oulasvirta, A., et al., "Embodied interaction with a 3D versus 2D mobile map", *Personal and Ubiquitous Computing*, Springer-Verlag London Limited, vol. 13, No. 4, Jul. 8, 2008, pp. 303-320.

Santitamnont, P. "Geo-information in the Age of Instant Access", Gis Development [online] Jan. 31, 2008, pp. 1-5 [retrieved on Apr. 7, 2010]. Retrieved from the Internet: <URL: http://www.gisdevelopment.net/magazine/global/2008/January/54.htm>.

Annex to Form PCT/ISA/206, Communication Relating to the Results of the Partial International Search for PCT Application No. PCT/US2009/063253, dated Mar. 9, 2010, 7 pages.

\* cited by examiner

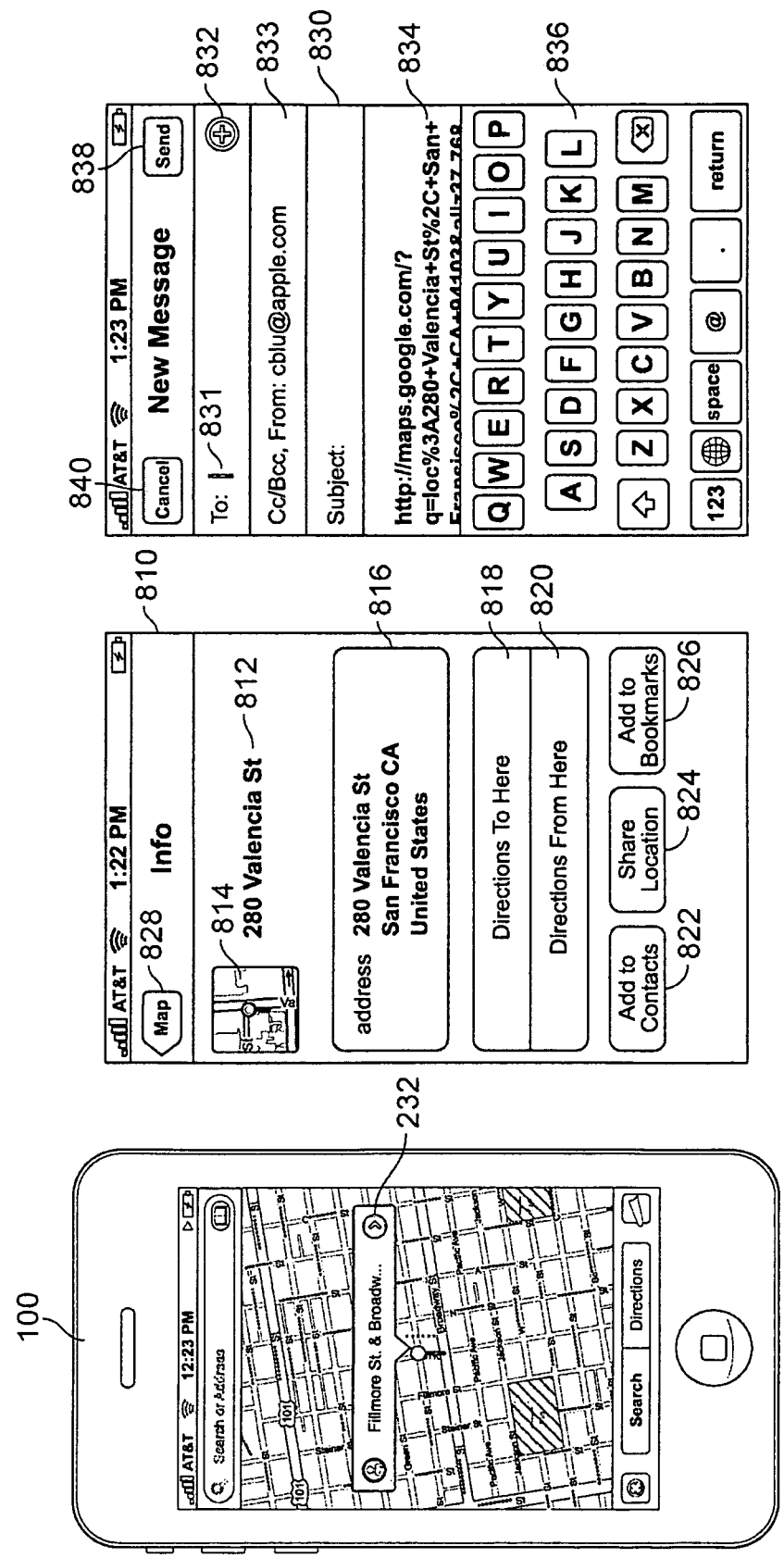

ns where no panoramic data is available. Sometimes, when a user does navigate to a location where no panoramic data is available, error messages would be displayed, and a smooth navigation experience is destroyed.

TECHNIQUES FOR MANIPULATING PANORAMAS

TECHNICAL FIELD

This subject matter is generally related to user interfaces for mobile devices.

BACKGROUND

Some mobile devices provide a map application which can use positioning technology to determine a user's current geographic location and display a map with an icon to show the user's current location. Map and other information (e.g., points of interest) can be provided by a map service in communication with the mobile device. Some map services can provide panorama views of certain user specified street locations. A map service may also provide a user with directions to a desired destination and present a route to the destination on the map.

Panoramic views of a street location are helpful in providing users with a sense of the actual environment surrounding the street location. This is useful when a user is physically present in an area near the street location. The panoramic images may help the user identify landmarks and find their bearings on the street. However, it is easy to lose one's sense of direction when looking at a panoramic image because the field of view in a panoramic image is relatively limited. Furthermore, transitions from location to location, or direction to direction in the panoramic view can be jagged due to the limited picture frames available between locations or between directions. In addition, there is a conceptual disconnect between a 2D street map that offers a 2D abstraction of the streets seen from above and a 3D view of the surrounding environment of a location on the street map. It is conceptually difficult for a user to link the 2D street grid around a location on a 2D street map to the buildings and streets in a street panorama.

Conventional methods for displaying panoramic images provide a street panorama inside a window laid on top of a street map, such that a portion of the street map showing the street location of the panorama can be identified by a placemark. As the street panorama for a first location is changed into the street panorama of a second location, the placemark on the street map can be updated accordingly.

Having an underlying street map with a placemark indicating the current location associated with the street panorama on display helps a user to reorient themselves within a panorama to a limited extent. For example, "jumps" from location to location in the panoramic view window can be tracked by the movement of the placemark in the underlying street map. However, this method of using a reference map outside the panorama does not provide information regarding the direction or angular extent of the field of view. Users still may easily lose their bearings in the panoramas. Furthermore, without a smooth transition between the street view and the panoramic view, users may struggle with identifying the correct landmarks in the panoramas to help them re-orient themselves and find their bearings.

The conventional methods for facilitating users finding their orientations require screen space to accommodate both the street panorama and the underlying reference street map. In mobile devices where screen space is limited, it is desirable to allocate as much space as possible to the panorama when a user enters the panorama view.

Conventional methods deal with the no-data situation by preventing users from entering the panoramic views of loca-

SUMMARY

In some implementations, a multi-step animation sequence for transitioning from a street map view to a panorama view of a specified street location is disclosed. An orientation overlay can be displayed on the street panorama, showing a direction and angular extent of a field of view of the street panorama. An initial specified street location and a current location of the street panorama can also be displayed. A navigable placeholder panorama can be used when street panorama data is unavailable. A perspective view of a street name annotation can be laid on the surface of a street in the panorama. Methods for displaying annotation boxes on a transit route with minimal cluttering and for rerouting by detecting a deviation from a predetermined route are also disclosed.

In one aspect, a computer-implemented method is described that includes, presenting a street map showing a specified street location on a display; receiving user input requesting a panorama view of the specified street location; and presenting an animated sequence transitioning from the street map to the panorama view of the specified street location, where the animated sequence comprises: zooming into the specified street location on the street map; transitioning from the zoomed street map to a street panorama with a field of view showing a street surface at the specified street location; and spinning the street panorama such that the field of view tilts up from the street surface to the horizon.

In another aspect, a computer-implemented method includes: presenting a street panorama of a specified street location; and presenting an orientation overlay on the street panorama, where the orientation overlay indicates a direction and an angular extent of a field of view of the street panorama on a portion of a street map.

In another aspect, a computer implemented method includes, presenting a map showing a specified location on a display; receiving a first user input requesting a panorama view of the specified location; presenting an animated sequence transitioning from the map to the panorama view of the specified location, where the animated sequence comprises: zooming into the specified location on the map; transitioning from the zoomed map to a panorama with a field of view showing a street surface at the specified location; and spinning the panorama such that the field of view tilts up from the street surface to the horizon. Upon completion of the animated sequence, the method includes receiving a second user input rotating the display. Upon receiving the second user input, the method includes presenting an orientation indicator (e.g., a pie-shaped indicator) on the street panorama showing a portion of the street map containing the specified street location. In some implementations, an angle of a pie slice in the pie-shaped orientation indicator opens in a direction of the field of view and has a size based on an angular extent of the field of view; a vertex of a pie slice of the pie-shaped orientation indicator overlaps with the specified street location on the portion of the street map; and the specified street location is identified by a visual indicator on the portion of the street map.

In another aspect, a computer-implemented method includes, receiving a user input to share a specified street location on a map; and displaying an email message in an email editor, the email message having a Universal Resource Locator (URL) of the specified street location embedded in a message body.

In another aspect, a computer-implemented method includes, presenting a first annotation box associated with a first location on a map displayed on a mobile device, where the first annotation box has a first annotation area and a first leader connecting the first annotation area to the first location on the map; presenting a second annotation box associated with a second location on the map, where the second annotation box has an second annotation area and a second leader connecting the second annotation area to the second location on the map, and where the first location and the second location can be identical; and adjusting locations of the first annotation area and the second annotation area such that they do not overlap.

In another aspect, a computer-implemented method includes, receiving input specifying a starting location and an end location on a mobile device; determining a set of transit steps for a route from the starting location to the end location, where the transit steps comprise at least one of embarking on a public transportation means, walking, or biking; detecting a deviation from the route; and updating the set of transit steps based on the deviation.

Other implementations are disclosed which are directed to systems, methods and computer-readable mediums.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

FIGS. 8A, 8B, and 8C are example user interfaces for sharing a specified street location by email on a mobile device.

DETAILED DESCRIPTION

Example Mobile Device

Figure 1:
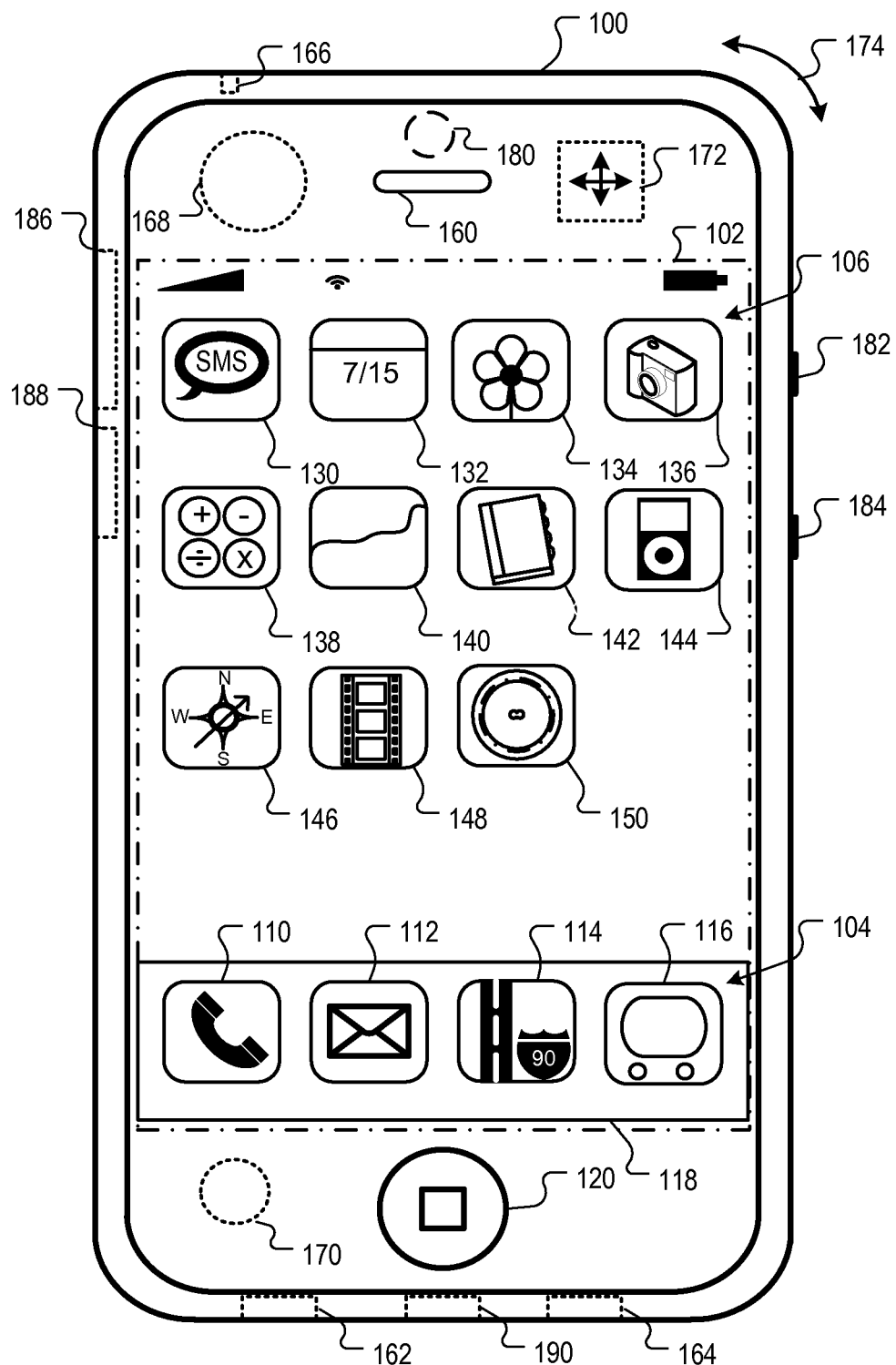
FIG. 1 is a block diagram of an example mobile device.

FIG. 1 is a block diagram of an example mobile device 100. The mobile device 100 can be, for example, a handheld computer, a personal digital assistant (PDA), a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can be implemented with liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a map devices, as indicated by the Maps object 114; a Wi-Fi base station device (not shown); and a network video transmission and display device, as indicated by the Web Video object 116. In some implementations, particular display objects 104, e.g., the phone object 110, the e-mail object 112, the Maps object 114, and the Web Video object 116, can be displayed in a menu bar 118. In some implementations, device functionalities can be accessed from a top-level graphical user interface, such as the graphical user interface illustrated in FIG. 1. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Maps object 114 may cause the graphical user interface to present display objects related to various maps functions; and touching the media player object 116 may cause the graphical user interface to present display objects related to various web video functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a address book object 142, a media player object 144, a Web object 146, a video object 148, a settings object 150. Touching the SMS display object 130 can, for example, invoke an SMS messaging environment and supporting functionality; likewise, each selection of a display object 132, 134, 136, 138, 140, 142, 144, 146, 148, and 150 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Maps Service User Interface

Figure 2:
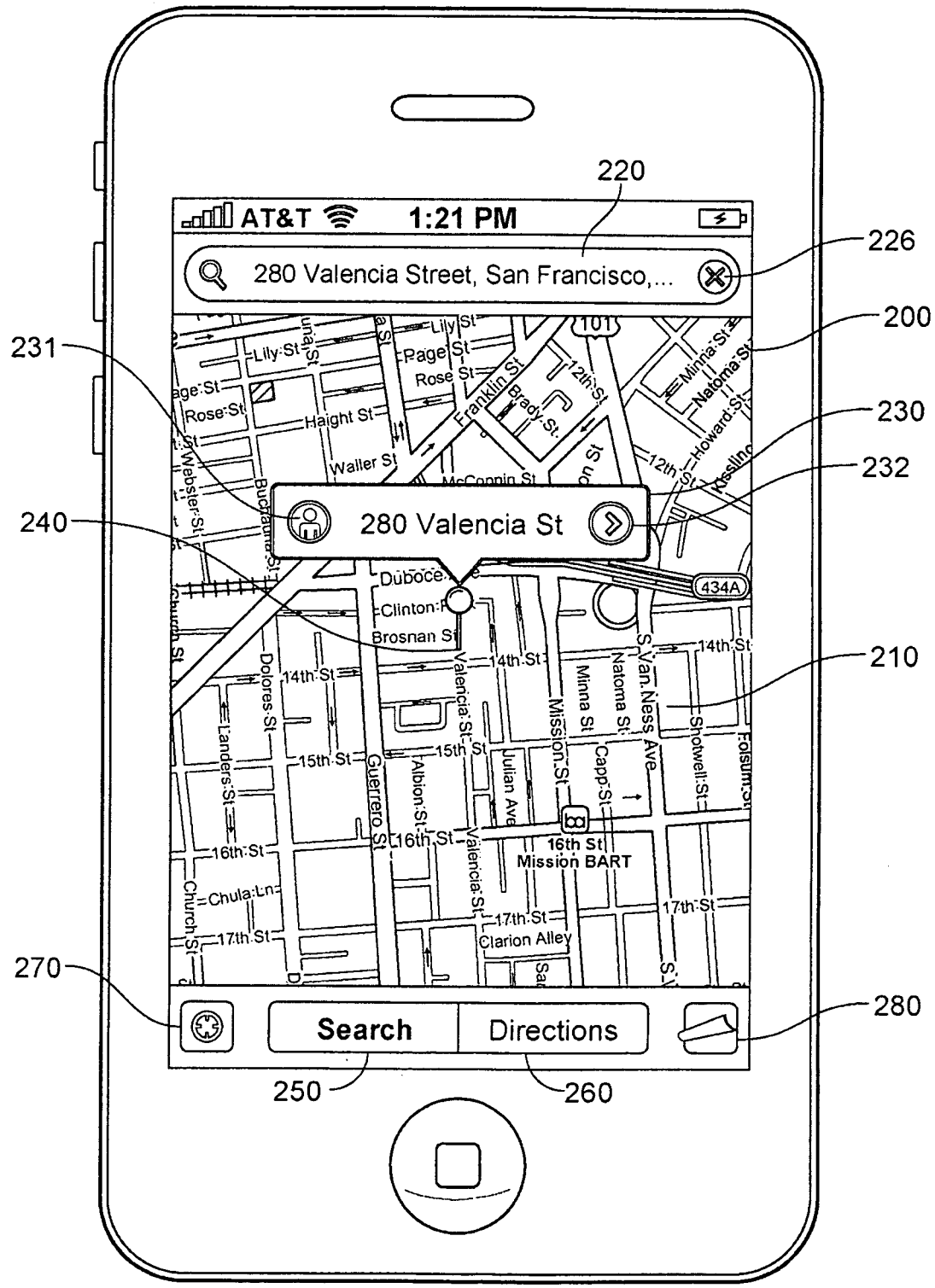
FIG. 2 is an example user interface presenting a street map and a specified street location on the street map.

FIG. 2 is an illustrative example of a user interface 200 for providing maps or navigation services on a mobile device 100 in FIG. 1. For example, in FIG. 2, the user interface 200 allows a user to grab and move a placemark (e.g., a push pin) on a map, and drop it at any desired location on the map. The user interface 200 also allows a user to specify a location by entering a street address in the user interface, and the location of the street address is then found and indicated by a placemark (e.g., a push pin) on the map.

In some implementations, the street map displayed in the user interface 200 can be any map showing roads, streets, and/or paths in an area. For example, the street map displayed can be an aerial photograph of the area represented, a road atlas, a regular map showing city streets and roads, a map showing the grounds of a facility or building, or a map showing key landmarks. In some implementations, the map displayed in the user interface 200 can be other two-dimensional representations showing locations of objects.

In some implementations, the example user interface 200 comprises one or more of the following user interface elements for presenting information and receiving user inputs: a street map (or a relevant portion of the street map) 210, a user interface element 220 for receiving a search term or address, a user interface element 226 for closing the user interface element 220, thus reducing clutter once the address has been entered and the specified location has been identified on the map, a user interface element 230 for providing address information of a currently specified location on the map, a user interface element 231 for invoking a panorama view of the currently specified location on the map, a user interface element 232 for invoking an address information interface to obtain more information on the specified location and navigation options, a user interface element (or a placemark object) 240 for identifying a currently specified location on the map, a user interface element 250 for invoking a search interface with more address search options, a user interface element 260 for invoking a directions interface for getting directions, a user interface element 270 for obtaining the current location of the mobile device (self-location function), and identify it on the map, and a user interface element 280 for starting a page curl animation to reveal options related to placemarks.

In some implementations, the mobile device 100 can utilize an external map service provider. For example, the street map 210 can be obtained from Google Maps service, operated by Google Inc., Mountain View, Calif.

In some implementations, a user can specify a street address or location through various means available on the user interface 200. For example, a user can enter a search phrase such as a business name or a street address in the text input area of the user interface element 220. Alternatively, a user can select an address stored in the address book application on the mobile device by invoking the user interface element 225 showing an address book icon. In some implementations, the mobile device 100 presents a map with a previously searched or stored address as the currently specified location. In some implementations, where the mobile device has a touch-sensitive display, a user can specify a street location by touching a map location on the touch-sensitive display. In some implementations, touching the display causes a placemark object 240 to appear on the display, and a user can grab and drag the placemark object to a desired location on the map. In some implementations, where the touch-sensitive display responds to multi-touch gestures, the user can move to a different portion of the map or zoom in or out of a portion of the map by specific finger movements on the touch sensitive display (e.g., a pinch gesture). In some implementations, the user can enter the current location of the mobile device by touching the user interface element 270 (the "self-locate" icon).

In some implementations, the user interface element 230 for providing address information of a currently specified location is implemented as a callout specifying the street address of the location. For example, the specified street location in FIG. 2 is "280 Valencia Street." In some implementations, the street address information is obtained from an external maps service and presented to the user.

In some implementations, the user interface element 231 for invoking a panorama view of the specified location can be presented on the user interface element 230. More details on navigating panoramas can be found in discussions with respect to FIGS. 3-7.

In some implementations, the user interface element 232 for invoking an address information interface to obtain more information on the specified street location and navigation options can be presented on the user interface element 230. More details on the address information interface and related functions can be found in discussions with respect to FIGS. 8-10.

Example Transition Sequence to Panorama View

FIGS. 3A-3K illustrate an example animation sequence to transition from the street map view to a panoramic view of the specified street location.

A street panorama, in a general sense, is a wide-view photograph or depiction of surrounding environment of a street location that the street panorama is associated with. In some implementations, a street panorama is a photographic image taken at a street location with an omni-directional camera. In some implementations, a street panorama is a composite of a series of photographs taken at a street location with the camera being panned (i.e., turned in the horizontal direction around a vertical axis) and tilted (i.e., turned vertically around a horizontal axis) continuously to cover the views in all directions. In some implementations, a street panorama can be a continuous feed from a photographic or video camera that is stationed at a street location and can be panned and tilted in real-time.

In some implementations, when the panorama is viewed on a two-dimensional surface, such as the display of the mobile device 100, only a portion of the omni-directional image is displayed at a time to show what is within the camera's field of view in a particular direction. The particular direction associated with a field of view can be defined by an azimuthal angle measured from a known direction (such as the North) and a tilt angle measured from a known direction (such as the horizontal plane). For example, a picture taken by a camber facing the West has a field of view associated with an azimuthal angle of −90 degrees, and a tilt angle of 0 degree. For another example, if the camera now slowly tilts down, and eventually faces straight down on the ground, the same azimuthal angle for the field of view remains the same while the tilt angle of the filed of view gradually reduces to −90 degrees.

In additional to a direction, the field of view is also characterized by an angle of view. The angle of view describes the angular extent of a given scene that is imaged by the camera. For example, a close-up image would be associated with a wider angle of view, and a long-shot from a distance would be associated with a narrower angle of view.

A panoramic image can be manipulated in a display area to show views from substantially all directions in 3D. A user can drag an image left and right, up and down to change the directions and tilt of the field of view. A user can also zoom in and out of a particular image to vary the angular extent of the field of view. In some implementations, users can navigate from a panorama of a first street location to a panorama of a second street location by clicking on a navigation control element superposed on the panoramic image. In some implementations, manipulation of the panoramic image can be accomplished by a series of finger gestures on a touch-sensitive display. For example, the azimuthal viewing direction can be changed by a finger movement wiping across the display in a generally horizontal direction; the tilt viewing direction can be changed by a finger movement wiping across the display in a generally vertical direction. For another example, zooming in and out (i.e., widening and narrowing the angle of view) can be accomplished by two fingers moving apart from or together to each other on the touch-sensitive display.

Referring again to FIGS. 3A-3K, in some implementations, the animation sequence connects the two-dimensional ("2D") map view to the three-dimensional ("3D") panoramic view by presenting visual effects imitating an aerial view over a specified location on the 2D street map, zooming to the street level, and then pitching or tilting up the user's field of view into a 3D street view provided by the 3D panorama. This multi-step animation sequence allows a user to visually and mentally link a flat street map graphic to a digital image of a street view. The animation step of pitching the field of view up from the street surface can be performed smoothly. By providing a smooth, multi-step animation sequence, transitioning from a two-dimensional map view to a three-dimensional panoramic view allows a user to more easily orient themselves in the panoramic street view.

Figure 3A:
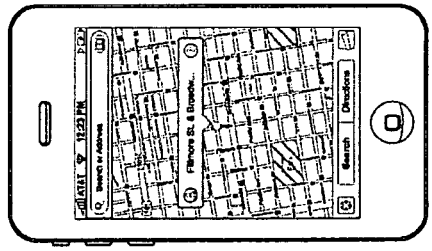
FIGS. 3A-3K illustrate an example animated sequence transitioning from a street map view to a panorama view of a specified street location in the street map view.
Figure 3B:
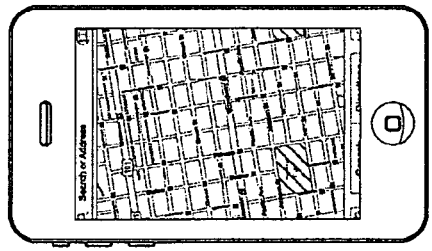

Referring to FIG. 3A, the user interface of FIG. 2 shows a street map 210, a specified street location on the street map, and various user interface elements. During the multi-step animation sequence described above, the user interface elements gradually fade away, as the display zooms into a street view at the location of Fillmore & Broadway.

Figure 3C:
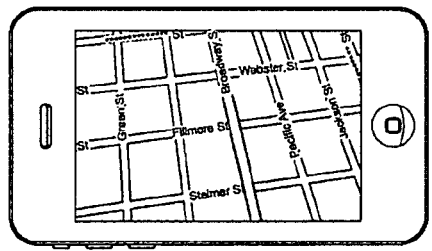
Figure 3D:
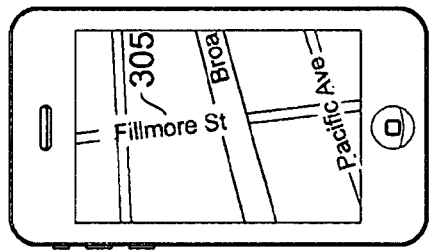

FIGS. 3A-3D show the zooming part of the multi-step animated sequence. The images presented in the display incorporate some blurring effects to provide a sense of motion as if the viewer is diving into the specified street view from above. In some implementations, the zooming part of the animated sequence can also incorporate some blurring effects to provide a sense of motion as if the viewer is diving into the specified street view from above at a slight angle. For example, the street grids shown in the animation sequence, such as those depicted in FIG. 3C and FIG. 3D, show a perspective view of the streets as if the viewer is diving down from above and from the left to the right. The visual effect of the horizontal motion (from left to right) is created because the street grid spacing is slightly wider (appears closer) on the left than on the right (appears farther). FIG. 3D shows the street name 305 (Fillmore Street in this example), and the direction of the street as it appears in the 2D street map.

Figure 3E:
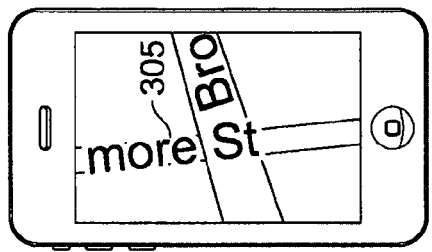

After the zooming step of the animation sequence is completed, the zoomed 2D street map is transitioned into a street view panorama showing a street surface (FIG. 3E). The street name 305 and street orientation in FIG. 3E provide the necessary visual and mental association between the street map and the panoramic view.

Figure 3F:
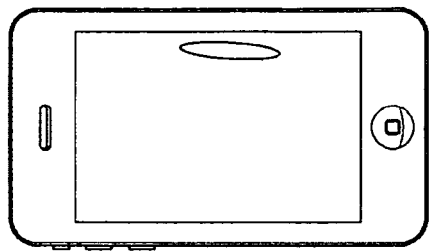
Figure 3G:
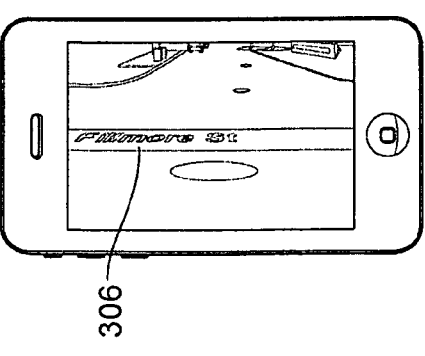

FIG. 3E and FIG. 3F show visual approximations of a user's perspective of what she sees when diving from above and landing on the ground at the street intersection identified by the placemark. In some implementations, the animated sequence can provide visual effects indicating such landing, such as a slight bouncing effect gradually stabilizing.

Figure 3H:
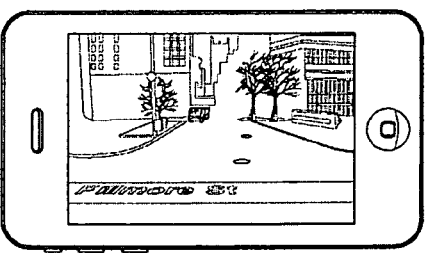

FIGS. 3E-3H show the pitching, tilting up, or adjusting part of the multi-step animated sequence. The initial field of view in the street view panorama seen by a user is the view of the street surface at the specified street location. In this example, the field of view has a tilt angle of approximately −90 degrees at this point. As the animated sequence progresses, the field of view tilts up from the street surface to the horizon (FIG. 3H). The field of view now has a tilt angle of 0 degree (assuming the reference plane is the horizontal plane). In some implementations, the animated sequence can also provide visual effects indicating the tilt-up motion, such as streaked street surface in the apparent direction of rotation (tilting up). In some implementations, visual effects, such as a gradually stabilizing bouncing effect can be added to imitate a camera head being spun upward and stopped.

In FIGS. 3E-3H, the street panorama is initially displayed in the mobile device in the portrait orientation. Usually, a panorama is a wide-view picture in the landscape orientation (viewed with the long side in the horizontal direction). However, in this scenario, when the display is held in the portrait orientation, the visual transition is smoother if the street panorama is first displayed in the portrait orientation as well. The visual and mental connection between the map view and the street view panorama is created by the street name and the street orientation common to both views.

In some implementations, when the display is held in the landscape direction, the street panorama can be initially displayed in the mobile device in the landscape direction as well. The transition from the street map can be similar to that described above with respect to FIGS. 3A-3H. FIGS. 3A-3H can serve to illustrate the animated sequence in the landscape orientation if viewed with a 90 degree rotation to the left (with the exception for certain user interface elements in the display).

For example, the zooming part of the animation sequence can incorporate some blurring effects to provide a sense of motion as if the viewer is diving into the specified street location from above. In some implementations, the zooming part of the animated sequence can also incorporate blurring effects to provide a sense of motion as if the viewer is diving into the specified street location from above and also going lightly forward. For example, the street grids shown in the animation sequence can show a perspective view of the streets as if the viewer is diving down from above and also in the direction from the bottom to the top of the display. The visual effect of the slight forward motion (from bottom to top of the display) can be created by having the street grid spacing slightly wider (appears closer) at the bottom than at the top (appears farther) of the display. After the zooming step is completed, the zoomed street map is transitioned into a street view panorama showing a street surface at the specified street location. Street name and/or street orientation common to both views can provide the necessary visual and mental association between the street view and the panoramic view. The field of view then tilts up from the street surface to the horizon. The slight forward motion provided during zooming also provides a smoother transition into the tilting up motion.

Figure 3I:
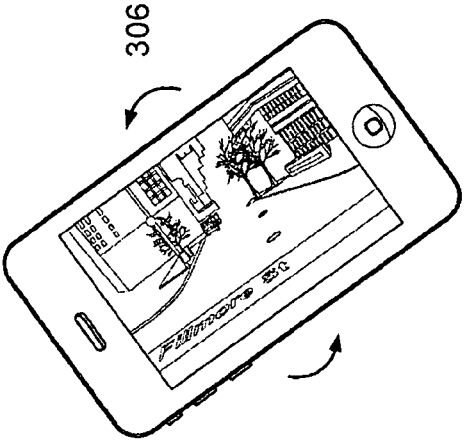

FIG. 3I illustrates a step for rotating the display or the mobile device into a landscape orientation if the mobile device was originally held in the portrait orientation and the street panorama was displayed in the portrait orientation. In some implementations, some visual effects can be provided to show the effect of the rotation on the street panorama. For example, the edges of the street panorama shown in the display are blurred or streaked during the rotation of the mobile device to provide a sense of motion.

Figure 3J:
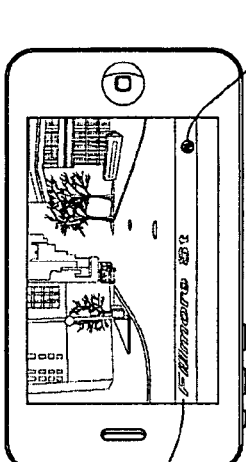
Figure 3K:
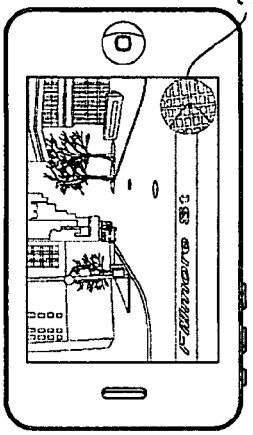

FIGS. 3J and 3K illustrate an example animation sequence for an orientation overlay 311 to be displayed in the street view panorama. In this example, the orientation overlay 311 is a pie-shaped indicator, starting as a tiny dot and gradually growing into a full-sized circular shape. In some implementations, additional visual effects can be added to the animation sequence as desired to attract the user's attention. For example, in this animation sequence, the pie-shaped indicator pulsates a little before stabilizing into its final size to attract the user's attention. In some implementations, other animation sequence can be used to introduce the orientation overlay, such as sliding in, fading in, bouncing in, and so on.

In FIG. 3K, the orientation overlay 311 encloses a portion of the street map surrounding the specified street location of the street view panorama, and the specified location is marked on the portion of the street map by a placemark (e.g., a top view of a push pin such as that shown in FIG. 2). The pie-shaped orientation indicator shows a pie slice (e.g., defined by a different color or opacity then the street map) with an angle facing the direction of the field of view of the street panorama. In this example, the default field of view of the street panorama faces a direction perpendicular to Fillmore Street 306. If North is up in the street map reference frame, then the pie slice has an angle facing West, which is what the street panorama shows. In some implementations, the shape of the orientation indicator can be other than circular, and the direction of the field of view can be illustrated by other visual indicators of direction, such as an arrow, a compass needle, a pointing finger, an eye, and so on. More details regarding the orientation indicator can be found in discussions with respect to FIGS. 4-7.

In some implementations, the animated sequence for introducing the pie-shaped orientation indicator is triggered by the user rotating the mobile device or the display into a landscape orientation. In some implementations, if the display is already held in the landscape orientation, the animated sequence for introducing the pie-shaped orientation indicator continues automatically from the animated sequence for transitioning from the map view to the panoramic view (FIGS. 3A-3H). In some implementations, even if the display is held in a portrait orientation initially, the animated sequence for introducing the pie-shaped orientation indicator can continue automatically from the animated sequence for transitioning from the street map view to the panoramic view, and the user can rotate the display after both animated sequences are completed.

The transition from the street map view to the panorama view can be implemented to include transitions from any kind of map that is displayed in the user interface 200 to a panorama associated with a location in the map. In some implementations, the street map displayed in the user interface 200 can be any map showing roads, streets, paths, or locations in an area and the panorama can be a panorama picture taken at a location in the area. For example, the street map displayed can be an aerial photograph of the area represented, a road atlas, a regular map showing city streets and roads, a map showing the grounds of a facility or building, or a map showing key landmarks. In some implementations, the map displayed in the user interface 200 can be other two-dimensional representations showing locations of objects.

In some implementations, the animated sequence can be invoked to transition from any images of locations or objects displayed in the user interface to a panoramic view of a specified location. For example, the image can be an image of the earth from space, an aerial photograph of a country, a terrain map of a geographic region, a regional whether map, and so on. In such implementations, the animated sequence include: zooming into the image displayed in the user interface, gradually transitioning into a zoomed view of the specified location on a 2D map, transitioning into a panoramic view of the specified location showing the ground (i.e., with a field of view facing downward), and pitching or tilting the filed of view up from the ground to the horizon.

Example Street Panorama and Street Annotations

Figure 4:
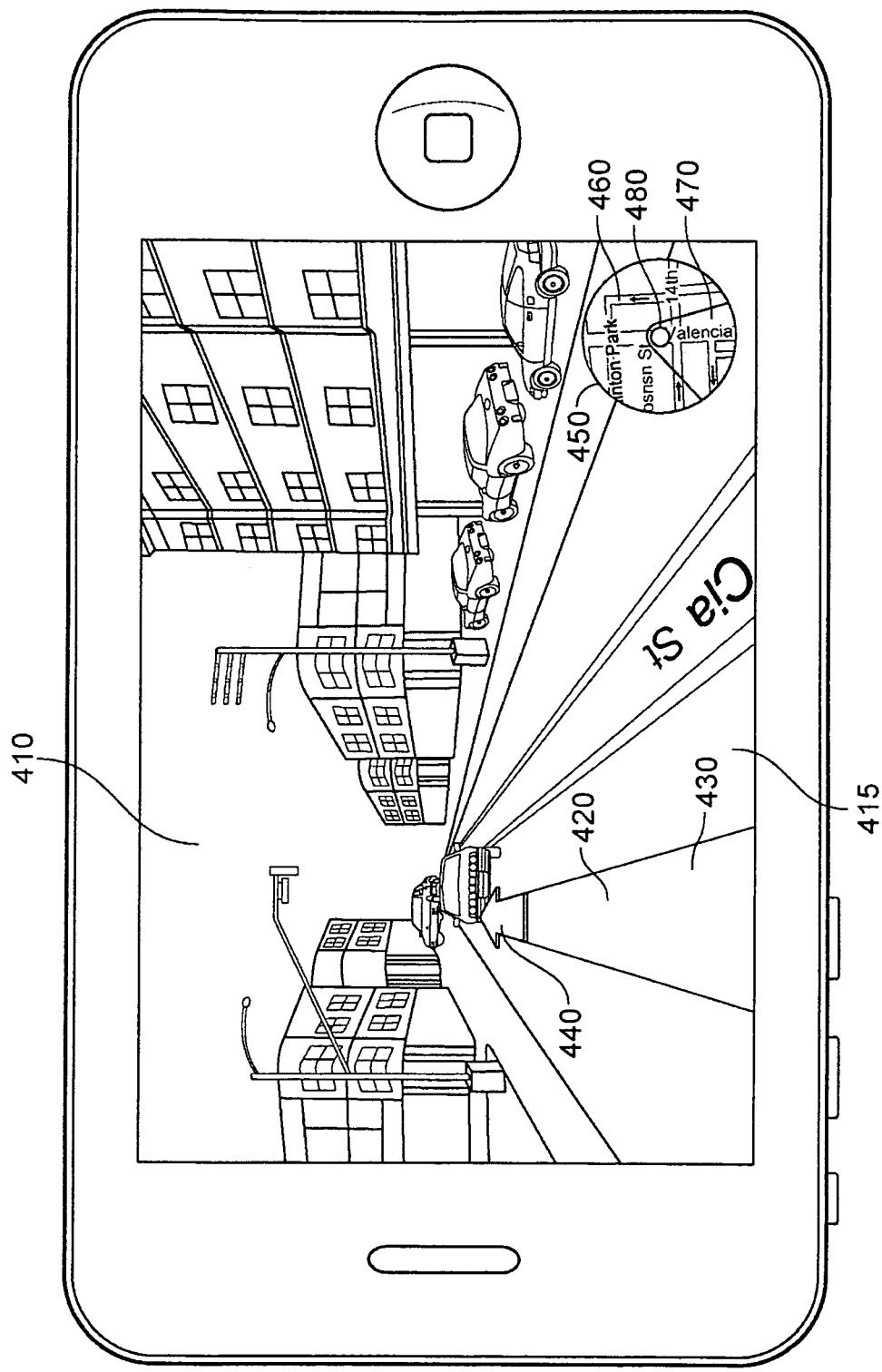
FIG. 4 is an illustrative example of a street panorama shown in a mobile device, and various user interface elements, such as a street name annotation, a navigation indicator, and an orientation overlay.

FIG. 4 is an illustrative example of a street view panorama at a specified street location. In this example, the specified street location is on Valencia Street close to the intersection between Valencia Street and the 14$^{th}$ Street in San Francisco, Calif.

The display of the mobile device 100 shows a street panorama 410 at the specified street location. In the street view panorama 410, a number of user interface elements are presented to facilitate user interaction with the street view panorama 410, including: a ribbon 420 (which can be semi-transparent), a street name annotation 430, and a navigation indicator/control 440. In addition, an orientation overlay 450, in this example a pie-shaped orientation indicator 450, is displayed in the lower right corner of the street view panorama 410. The pie-shaped orientation indicator encloses a portion 460 of the street map surrounding the specified street location of the street view panorama 410. A placemark 480 is placed on the portion of the street map enclosed in the orientation indicator 450, identifying the position where the user first enters the specified street location. A pie slice 470 of the pie-shaped orientation indicator shows the direction of the field of view of the street view panorama 410 with the direction of its open angle. In this example, the field of view shows a direction facing the intersection between Valencia Street and 14$^{th}$ Street. Before a user moves to a panorama of a new street location adjacent to the specified street location, the vertex of the pie slice 470 shows the location of the current panorama on display and overlaps with the visual indicator 480 of the specified street location.

The semi-transparent ribbon 420 lies on the street surface 415 of Valencia Street. A perspective view of the semi-transparent ribbon 420 is provided such that its long side runs (or appears to run) in the direction of Valencia Street. Embedded in the semi-transparent ribbon 420 is a street name annotation 430. In some implementations, the street name annotation 430 is the text of the street name provided in a perspective view embedded in the semi-transparent ribbon 420. In some implementations, the street name annotation 430 can be embedded directly on the street surface 415 in the panorama 410. In some implementations, only a partial view of the street name annotation 430 is displayed illustrating the limited field of view in the street view panorama 410. The perspective view of the street annotation 430 shows the street name text as though it was written on the street surface 415, or embedded in the semi-transparent ribbon 420 lying on the street surface 415. The perspective view of the annotation text can change according to a change in the direction and tilt of the field of view of the street view panorama 410.

In some implementations, it may be advantageous to have the annotation text lying on or embedded in the street surface 415 or a semi-transparent ribbon 420 lying on or close to the street surface 415 to create a realistic feel of the street environment without the presence of artificial graphic indicators cluttering the screen. Furthermore, by embedding the annotation on the street surface 415 or a semi-transparent ribbon 420 lying on or close to the street surface 415, the panoramic street view is not occluded by the annotation or the semi-transparent ribbon 420 as the user changes the direction or tilt of the field of view.

The navigation control 440 in FIG. 4 is an arrow-shaped user interface element located at the end of the ribbon 420 that points in the direction of navigation that it controls. Other shapes can also be used to indicate a navigation control for transitioning to a new street panorama from the present one. A user can select the navigation control 440 (e.g., through touch input) to cause the display to transition from the present street panorama 410 to an adjacent street panorama in the direction pointed to by the navigation control 440. In this example, by selecting the navigation control 440, the user can navigate to the next available street panorama in the direction going toward the intersection between Valencia Street and 14$^{th}$ Street. In some implementations, a user can select the navigation control 440 by a single tap on a touch-sensitive display of the mobile device, a by a click using a pointing device such as a mouse or a stylus. A transition from one street panorama to the next street panorama is shown by the shifting of the street map enclosed by the orientation indicator 450. As the original specified street location remains marked by the placemark 480, the new street location shown in the street panorama is identified by the vertex of the pie-slice, which always stays at the center of the pie-shaped orientation indicator 450. The relative distance between the original specified street location and the current street location can be shown on the portion of the street map 460 by the separation of the placemark 480 and the vertex of the pie-slice 470.

In some implementations, the street panorama also responds to direct manipulation of the panorama image displayed on the screen. For example, a user can change the direction (azimuth angle) of the field of view by grabbing and dragging the image to the left or right, or by one or more finger movements swiping across the touch-sensitive display in a desired direction. A user can also change the tilt (tilt angle) of the field of view by grabbing and dragging the image up and down, or by one or more finger movements swiping across the touch-sensitive display in a desired direction. In some implementations, a movement at an angle can cause both the direction and tilt to change.

Example Navigable Placeholder Panorama and Street Annotations

Figure 5:
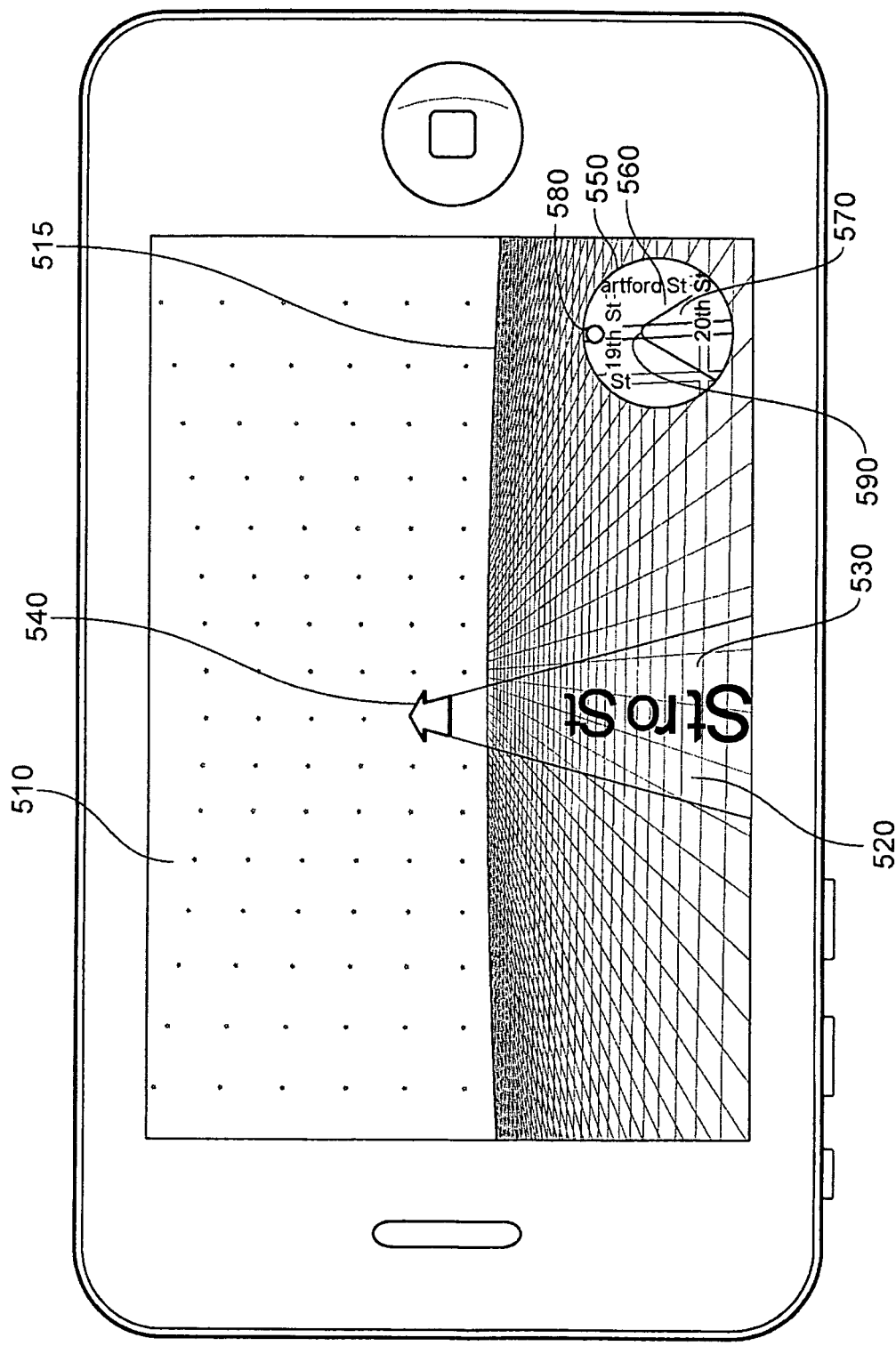
FIG. 5 is an illustrative example of a navigable placeholder panorama.

FIG. 5 is an example panorama displayed in the user interface when data for a street view panorama at a specified street location or a current street location is not available.

There can be many reasons why data for a street panorama at a particular street location is not available. For example, there may not be sufficient bandwidth at a particular location for the mobile device to receive the image data, or no panoramic image has been taken of the location by the service provider due to privacy, costs, or other practical reasons.

Conventionally, a "no data" indicator, such as a blank page or notification text, is displayed in the user interface when a user attempts to navigate to a new place using a navigation control on a street panorama and the mobile device receives a "no data available" signal from the map service provider. In other methods, users are preempted from entering regions where no panorama information is available. For example, in some conventional implementations, regions with panoramas available are highlighted and a user can only specify locations within the highlighted area to receive panoramic views. In some implementations, no navigation control is available toward a direction if no panoramic data is available for the next street location in that direction.

These conventional methods deal with the no-data situation by preventing users from entering the panoramic views of locations where no panoramic data is available. However, a user holding a mobile device may still be able to navigate physically to these locations in reality. Therefore, it is desirable to provide the user with some type of navigable placeholder panoramas such that she can navigate cross the region with no panoramic image data on the display, and reach regions with panoramic image data without having to reorienting herself in the panoramic view. The sense of continuity created by a navigable placeholder panorama is not available in conventional methods of dealing with the no-data situation.

FIG. 5 shows an example navigable placeholder panorama 510 that can be displayed in place of an absent street panorama. For example, in the animated sequence transitioning from the street map view to the panoramic view shown in FIG. 3, if no street panorama data is available for the specified street location, then a placeholder panorama 510 can be displayed instead. The same zooming, landing, and tilting up sequence can be displayed, except the placeholder panorama image or graphic is used in lieu of the absent street panorama.

The look of the placeholder panorama 510 can vary. In this example, the placeholder panorama 510 includes a first patterned area (the ground) bounded by the horizon and a second patterned area (the sky) above the horizon. In some implementations, the pattern used for the ground can be a checkerboard pattern and the pattern used for the sky can be a star field pattern. In some implementations, colors can also be used for the patterns, such as blue for the sky and grey for the ground. In some implementations, generic drawings or wireframes of buildings and sidewalks can be used to fill the space around the streets in the placeholder panorama.

In some implementations, the mobile device superimposes the same set of user interface elements on the placeholder panorama 510 as for a normal street view panorama, including: a semi-transparent ribbon 520 running along the direction of a street at the specified street location, a street name annotation 530 embedded in the semi-transparent ribbon 520, and a navigation indicator 540 showing a direction of navigation. The placeholder panorama 510 can also include the same orientation overlay, such as the pie-shaped orientation indicator 550, in the corner as do the normal street panoramas.

In some implementations, the semi-transparent ribbon 520 serves to represent the presence and direction of a navigable street at the specified street location. In some implementations, the information regarding the presence and direction of the navigable street can be obtained from the portion of the street map surrounding the specified street location. In some implementations, the semi-transparent ribbon 520 is show in a perspective view.

In some implementations, the annotation text 530 is a perspective view of the street name text embedded in the semi-transparent ribbon 520. The perspective view of the street name changes according to changes in the field of view shown in the placeholder panorama. For example, as the placeholder panorama 510 is panned (moved or rotated in the horizontal direction) or tilted (moved or rotated in the vertical direction) by the user, the perspective views of the semitransparent ribbon 520 and the embedded street name annotation 530 change accordingly.

In some implementations, the navigation indicator 540 can indicate a direction of navigation on or at the end of the semitransparent ribbon 520. The navigation indicator 540 can be presented even if no panoramic information is available for the next street location in the direction pointed by the navigation indicator 540. A user can select the navigation indicator 540, and advance to the next placeholder panorama associated with the next street location, and continue to navigate until she reaches a point where panoramic information is available and an actual street view panorama can be displayed.

In some implementations, the orientation overlay (such as the pie-shaped orientation indicator 550) is continuously updated to show the current location displayed in by placeholder panorama 510. For example, as the user navigates forward along the street (shown by the transparent ribbon 520) in the placeholder panorama 510, the portion of the street map 560 within the orientation indicator 550 is shifted gradually such that the vertex of a pie-slice 570 of the pie-shaped orientation indicator 550 overlaps with the street location of the current placeholder panorama 510 displayed.

In some implementations, a user can navigate and manipulate a placeholder panorama the same way as a normal street panorama, such as panning and tilting the field of view, zooming in and out of a particular view, or navigate to a second panorama of an adjacent location, using a pointing device, or various multi-touch gestures on a touch-sensitive display.

Example Orientation Overlay and Pie-Shaped Orientation Indicator

Figures 6A, 6B, 6C:
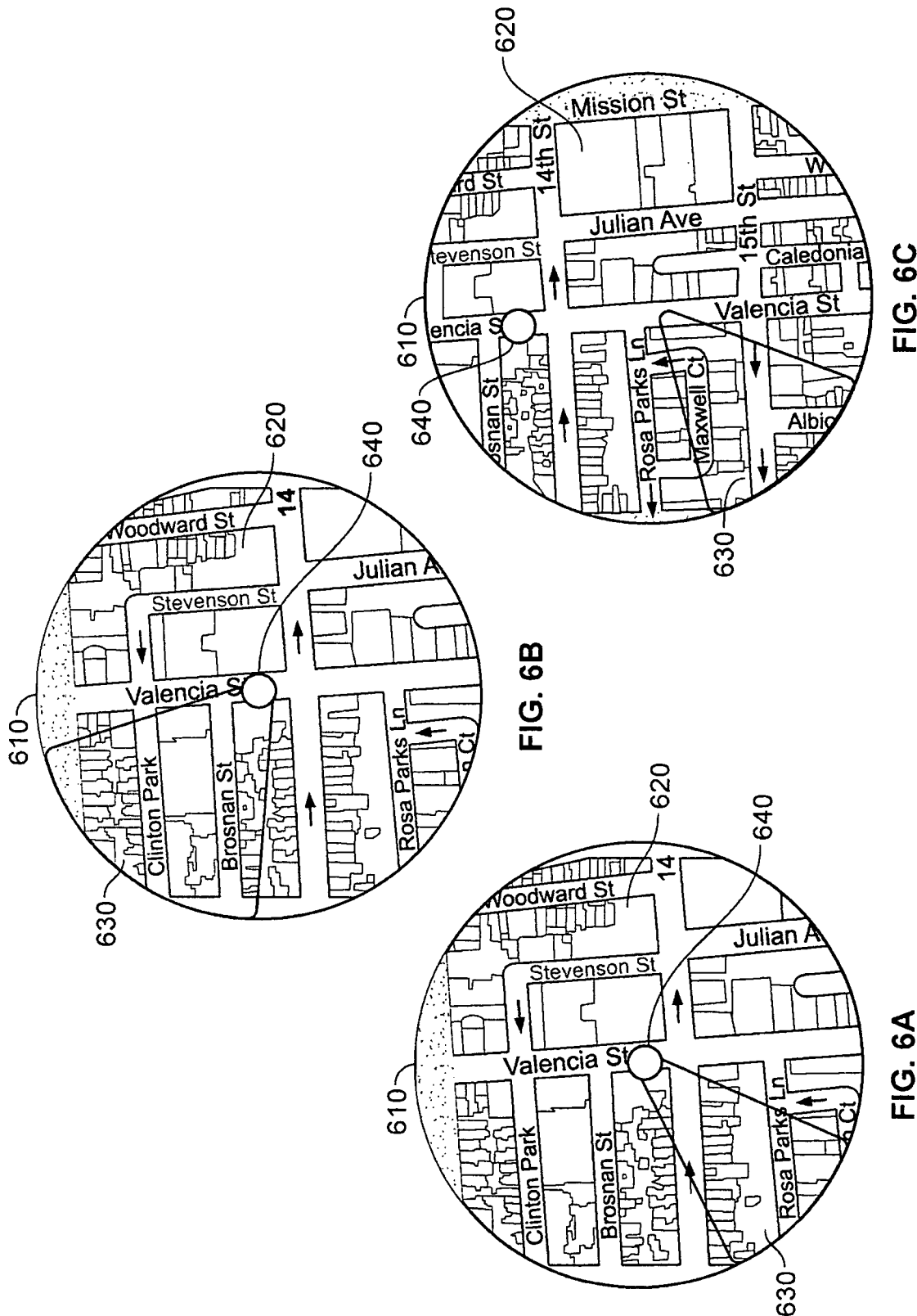
FIGS. 6A, 6B, and 6C are illustrative examples of a pie-shaped orientation indicator.

FIGS. 6A-6C illustrate an example orientation overlay 610 for a street panorama. In this particular example, the orientation overlay 610 is implemented as a pie-shaped orientation indicator, as shown in FIG. 4. Other implementations of the orientation overlay are also possible.

Conventional methods for displaying panoramas allow a user to get a sense of her position and orientation by using an indicator outside of the panorama display window. For example, the street panorama window can be overlaid on top of a street map showing the street location currently being displayed in the street panorama. A marker can be placed on the street location on the street map, and can be shifted accordingly as the user advances to the street panorama of an adjacent location. In order to show the direction of the field of view, an arrow pointing at that direction can be used in connection with the marker on the street map.

The conventional methods for facilitating user finding their orientations require screen space to accommodate both the street panorama and the underlying reference street map. In mobile devices where screen space is limited, it is desirable to allocate as much space as possible to the panorama when a user enters the panorama view. Although it is possible to store the street map outside the display area where a user can scroll to see when needed, it is still cumbersome and not sufficiently intuitive for users. It is therefore desirable to have an orientation overlay on top of the panorama that is small and intuitive to understand.

The orientation overlay 610 can serve a number of functions, including but not limited to: (1) indicating the current location of the panorama on display on a street map; (2) indicating the specified street location where the user initially entered the panoramic view mode; (3) indicating the current direction of the field of view of the panorama on display; (4) indicating the angular extent of the field of view of the panorama on display; and (5) indicating the relative distance between the initial entry point and the current location shown on the display.

FIG. 6 shows an example orientation overlay 610 implemented as a pie-shaped orientation indicator. In some implementations, the shape of the orientation indicator 610 can be circular, rectangular, or other 2D or 3D shapes. In some implementations, the shape of the orientation indicator can be varied according to the direction of the field of view. For example, the orientation indicator 610 can be circular in shape, but has a protruding tip on the edge to mark the direction of the field of view.

In some implementations, the orientation overlay encloses a small portion of the street map surrounding the street location of the panorama currently on display. In some implementations, the level of default magnification of the street map can be adjusted by the user.

In some implementations, the orientation overlay 610 displays a placemark on the portion of the street map enclosed by the orientation overlay. For example, in FIG. 6, placemark 640 is used to identify the specified street location from which the user initially entered the panoramic view. In this example, the placemark 640 in the orientation overlay 610 resembles the placemark 240 (a push pin) in FIG. 2. By using the same placemark, the user is provided with a sense of continuity between the street map view and the panoramic view. In some implementations, the placemark 640 can be out of sight when the user navigates a sufficient distance away from the initial specified street location. In some implementations, the street map enclosed by the navigation overlay 610 can be zoomed out such that the initial specified location always remains in sight within the portion of street map 620 enclosed within the orientation overlay 610. In some implementations, the user can select a new point of reference on the portion of street map enclosed in the orientation overlay. FIGS. 6A and 6B show the placemark 640 at the specified street location that the user initially entered the panoramic view. At this point the specified street location overlaps with the location of the street panorama currently on display. FIG. 6C shows the placemark 640 at a distance away from the center of the orientation overlay, indicating that the user has navigated from the specified street location from where she entered the panoramic view mode.

In some implementations, the orientation overlay 610 shows the direction of the field of view of the street panorama (or placeholder panorama) on display. The field of view has a direction that can be defined by an azimuth angle with reference to a known direction (such as North). In some implementations, the field of view can be also defined by a tilt angle with reference to a known plane (such as the horizontal plane). The orientation overlay 610 can represent the direction of the field of view by a direction indicator 630, such as a pie-slice of the pie-shaped orientation indicator 610. In this example, the direction indicator 630 has an open angle facing a direction, which indicates the direction of the field of view in the horizontal plane. In some implementations, the tilt angle of the field of view can be reflected by contracting the size of the pie-slice toward the center of the orientation overlay 610. When the field of view tilts away from the horizontal plane either toward the sky, or toward the ground, the direction indicator 630 (the pie slice) is contracted toward the center of the orientation overlay 610. In some implementations, the direction indicator 630 (the pie-slice) does not respond to changes in the tilt direction, and only responds to panning or rotations in the horizontal plane. For example, the three views of the direction indicator 630 in FIGS. 6A-6C show the field of view has been rotated in the horizontal direction. In some implementations, the direction indicator 630 can be shapes other than a pie-slice. It can be implemented as an arrow, a compass needle, or other shape features along the edge of the orientation overlay 610.

In FIGS. 6A-6C, the orientation overlay 610 shows the angular extent of the field of view of the street panorama (or placeholder panorama) on display. In the example shown in FIGS. 6A and 6C, the angular extent of the field of view is represented by the angle of the direction indicator 630 (the pie-slice). When the field of view shows a close-up shot, the angular extent is large. When the field of view shows a long shot, the angular extent is small. For example, the field of view shown in FIG. 6A corresponds to a close-up shot in the street panorama, while the field of view shown in 6B corresponds to a long short in the street panorama.

In some implementations, the relative distance between the initial specified street location and the current location can be shown by having a placemark for both the initial specified street location and the current location of the street panorama on display. In this example, the vertex of the direction indicator 630 (the pie-slice) indicates the current street location of the street panorama on display. In some implementations, other placemarks can be used as well.

In some implementations, the orientation overlay 610 can be semi-transparent and/or dim-lit such that it does not interfere with the street panorama on display. In some implementations, the dim-lit or semi-transparent orientation overlay can be lit up or enhanced when a user input is received, such as when a user touches it on a touch-sensitive display. In some implementations, the orientation overlay 610 can go back to the dormant dim-lit or semi-transparent state when it has not been invoked for a period of time. In some implementations, the orientation overlay does not have to have a well-defined shape, a user can cause an orientation overlay to appear lit up by wiping a corner of the display and the street map would be displayed as though from behind a frosted window that has just been wiped by the user's fingers.

In some implementations, the user can enlarge the orientation overlay 610 to get a closer look without exiting the panorama view. For example, the user can tap on the orientation overlay 610, and have a magnified version displayed on top of the street view panorama. The user can move the street map 620 enclosed within the orientation overlay 610 to see the surrounding streets. In some implementations, the street map 620 within the orientation overlay 610 can be zoomed in or out of in the same way as a normal street map displayed on the mobile device.

In some implementations, other placemarks can be displayed on the orientation overlay, such as to indicate a location of a contact, a destination location, or a location shared by another mobile device user.

Example Navigation Bar in a Street Panorama

Figure 7:
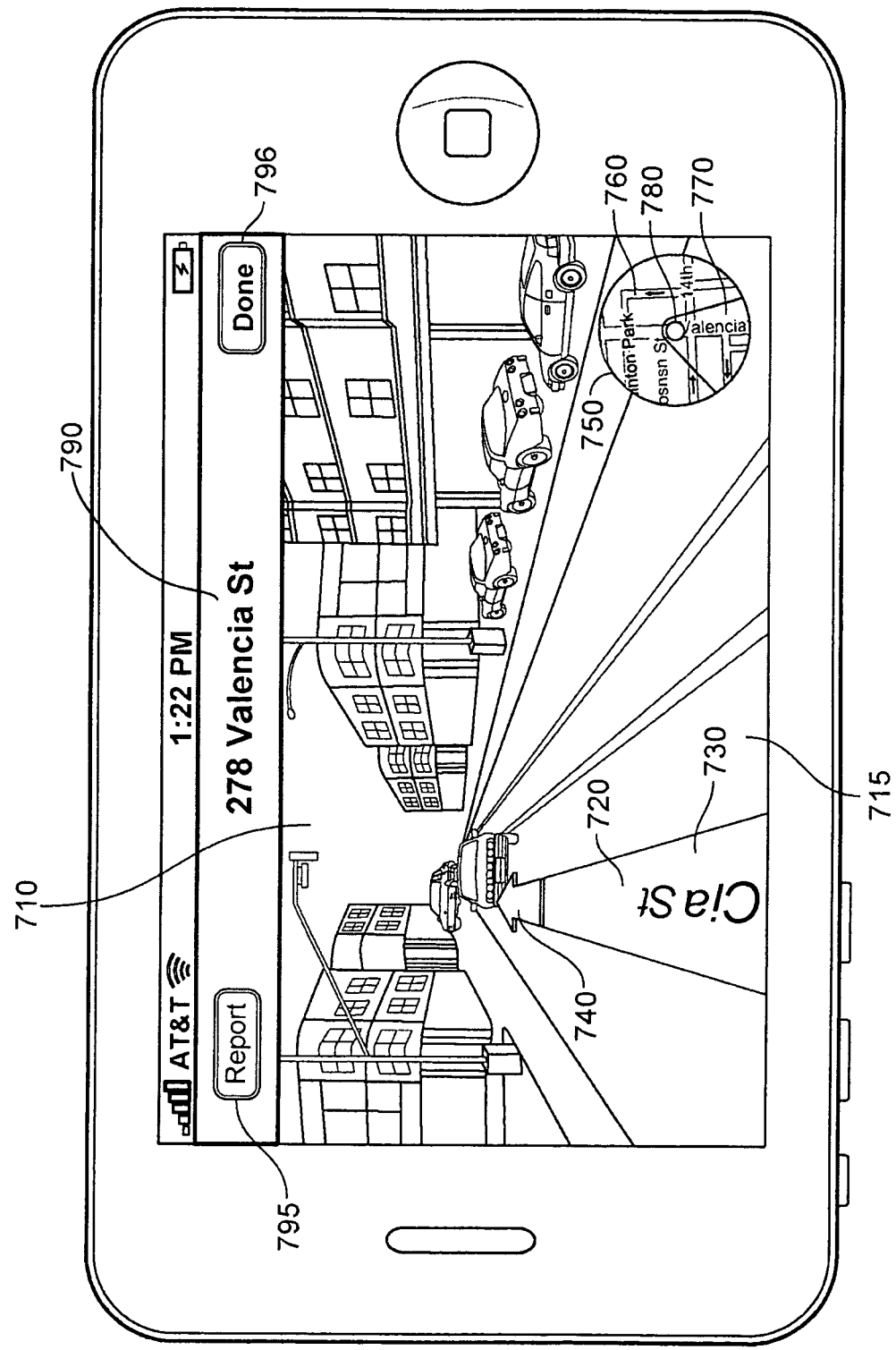
FIG. 7 is an illustrative example of a navigation bar superimposed on a street panorama.

FIG. 7 shows an illustrative example of a navigation bar that can be superimposed on a street panorama on display in a mobile device 100.

In this example, the display shows a street panorama 710 at a street location "278 Valencia Street." The display also includes one or more user interface elements for facilitating user navigation in the street panorama 710, including, a semi-transparent ribbon 720 running a long a street 715 (Valencia Street) in the street panorama 710, a street name annotation 730 embedded in the semi-transparent ribbon 720, a navigation indicator 740 indicating the direction of navigation, a orientation overlay 750, and a navigation bar 790 showing the street address of the current panorama on display. The orientation overlay further comprises a portion of a street map 760, a direction indicator 770 showing the direction of the field of view, a placemark 780 for the initial specified street location from which the user entered the panoramic view.

In this example, the navigation bar 790 is a user interface element showing the current street address of the street panorama on display. In some implementations, the navigation bar 790 can be updated to a new street address as the user navigates to a street panorama of a new street location, such as by selecting the navigation indicator 740. In some implementations, the navigation bar 790 is a semitransparent bar overlaid on street panorama toward to the top of the display, as shown in FIG. 7. In some implementations, the navigation bar 790 can further comprise other user interface elements. For example, in some implementations, the navigation bar 790 can include a user interface element 795 for reporting to a service provider of issues related to the street panorama on display. In some implementations, by selecting the user interface element 795, conventional methods for facilitating user finding their orientations require screen space to accommodate both the street panorama and the underlying reference street map. In mobile devices where screen space is limited, it is desirable to allocate as much space as possible to the panorama when a user enters the panorama view. Reporting user interface for reporting can be displayed and the user can enter requested information in the reporting interface. In some implementations, information related to the street panorama is automatically transmitted to an appropriate server without presenting another user interface to the user or entering any information. In some implementations, the user can report inappropriate content in the street panorama, such as those implicating privacy or age appropriateness concerns. In some implementations, the user can report quality issues related to the street panorama on display. In some implementations, the navigation bar 790 can comprise a user element 796 for closing the navigation bar 790. In some implementations, the user interface element 796 can be implemented as a "Done" button as shown in FIG. 7.

In some implementations, the navigation bar 790 can be invoked by a single user input on the street panorama, such as a single tap anywhere on street panorama being displayed on a touch-sensitive display.

Example Location Sharing User Interface

FIGS. 8A-8C illustrate example user interfaces for sharing a location on the street map in the mobile device 100.

FIG. 8A is an example user interface showing a street map previously shown in FIG. 2. In this example user interface, the user has specified a street location on the street map, as indicated by a placemark (the push pin). The user interface shown in FIG. 8A also shows a user interface element 232 (the same user interface element 232 in FIG. 2) for invoking an address information interface to obtain more information on the specified location and navigation options.

In some implementations, when a user selects the user interface element 232, an address information interface is invoked. An example address information interface 810 is shown in FIG. 8B. The address information interface 810 can include one or more of the following components: a text annotation 812 showing a portion of the street address identifying the specified street location, a icon or small map 814 showing the specified street location on the street map, an address card 816 showing the complete address of the specified street location, a user interface element 818 for invoking a directions interface with the specified street location as the destination, a user interface 820 for invoking a directions interface with the specified street location as the starting location, a user interface element 822 for invoking an interface to add the specified address in the address book on the mobile device, a user interface element 824 for invoking an interface to share the specified location with another, a user interface element 826 for adding the specified location on the street map to the bookmarks stored on the mobile device, and a user interface element 828 for restoring the display to the street map view in FIG. 8A.

In some implementations, by selecting the user interface element 824, a communication-related application for sending the specified location to a remote location can be invoked. In this particular example, an email application can be invoked. In some implementations, an instant messaging application (e.g., SMS) can be invoked. In some implementations, the communication-related application is invoked with a Uniform Resource Locator (URL) of the specified street address already embedded in the body of a message to be sent by the communication-related application. For example, in FIG. 8C, an email application is invoked in response to user input directed at the user interface element 824. The email application automatically composes an email message containing the URL 834 of the specified street location in the body of the message. The user can then enter the email addresses of the recipients in the "To" field 831 and the "CC/Bcc" field 832. The "From" field can be automatically filled by the mobile device using information already stored on the mobile device, such as information in a user profile of an address book. In some implementations, additional user interface element such as the "plus" button 832 can be added for users to add additional recipients from the address book. In some implementations, the display can also show a virtual keyboard 836 overlaid on the email message, from which a user can enter the text for the email message.

In some implementations, a user can set up a preference or program a multi-touch input gesture to invoke the share location function directly from the user interface shown in FIG. 8A. For example, by using a pre-determined or user-defined input gesture, a user can invoke the interface in FIG. 3C without going through the user interface in FIG. 3B.

In some implementations, a user receiving an email message containing the URL of a specified location can enter the maps application directly from the email message by selecting the URL in the message body. In some implementations, the specified location will be identified with a placemark and presented to the user in essentially the same format as shown in FIG. 8A.

Example Transit Route User Interface and Self-Arranging Annotations

There are several ways to invoke a route picker user interface for selecting transit routes in the mobile device 100. For example, the user interface element 270 in the street map view shown in FIG. 2, the user interface elements 818 and 820 in the address information interface shown in FIG. 8B can all be used to invoke a route picker application. In some implementations, a user can specify a start location and a destination location, and then select a mode of transportation to receive a set of routes. In some implementations, the start location or the destination location can be selected from a map, an address book application, a shared location, by using a self-locate function on the mobile device, or by entering the address of the locations in a text input area. In some implementations, the mode of transportations that can be selected can include "car," "public transit," "biking," or "walking." In some implementations, a user can specify preferences with respect to departure time, arrival time, number of transfers, preferred transit agencies or lines, total duration, total cost, etc. In some implementations, the routes are supplied by an external service provider, such as a public transit or map server. In some implementations, a set of different route can be provided to a user so that she can select a preferred route after reviewing each route option.

Figure 9B:
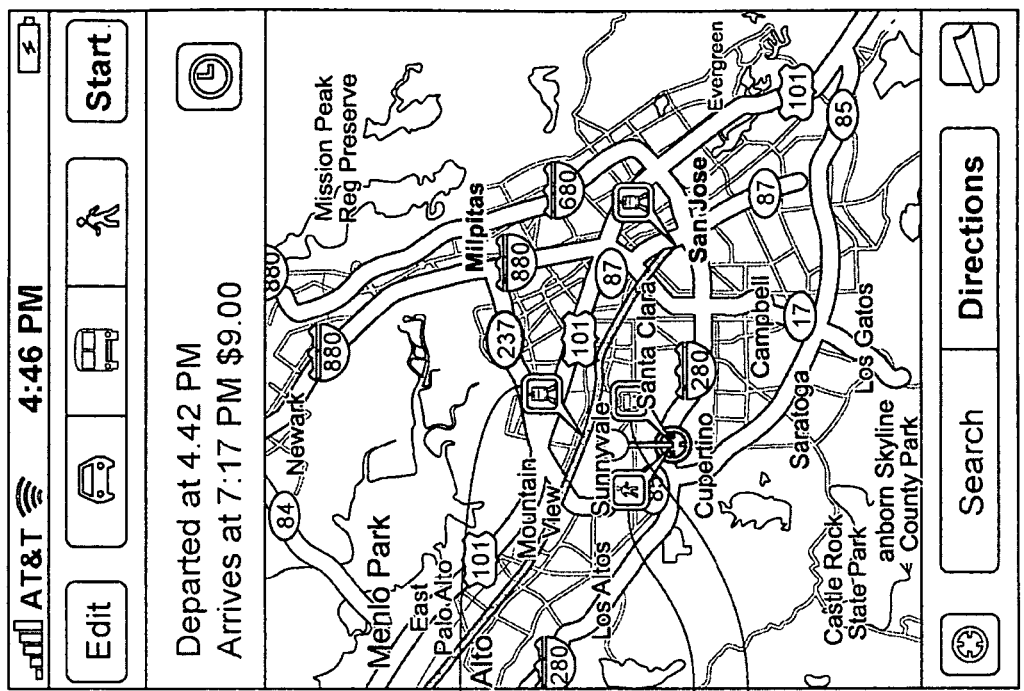
FIGS. 9A and 9B are illustrative example of user interfaces showing annotation boxes along a transit route.
Figure 9A:
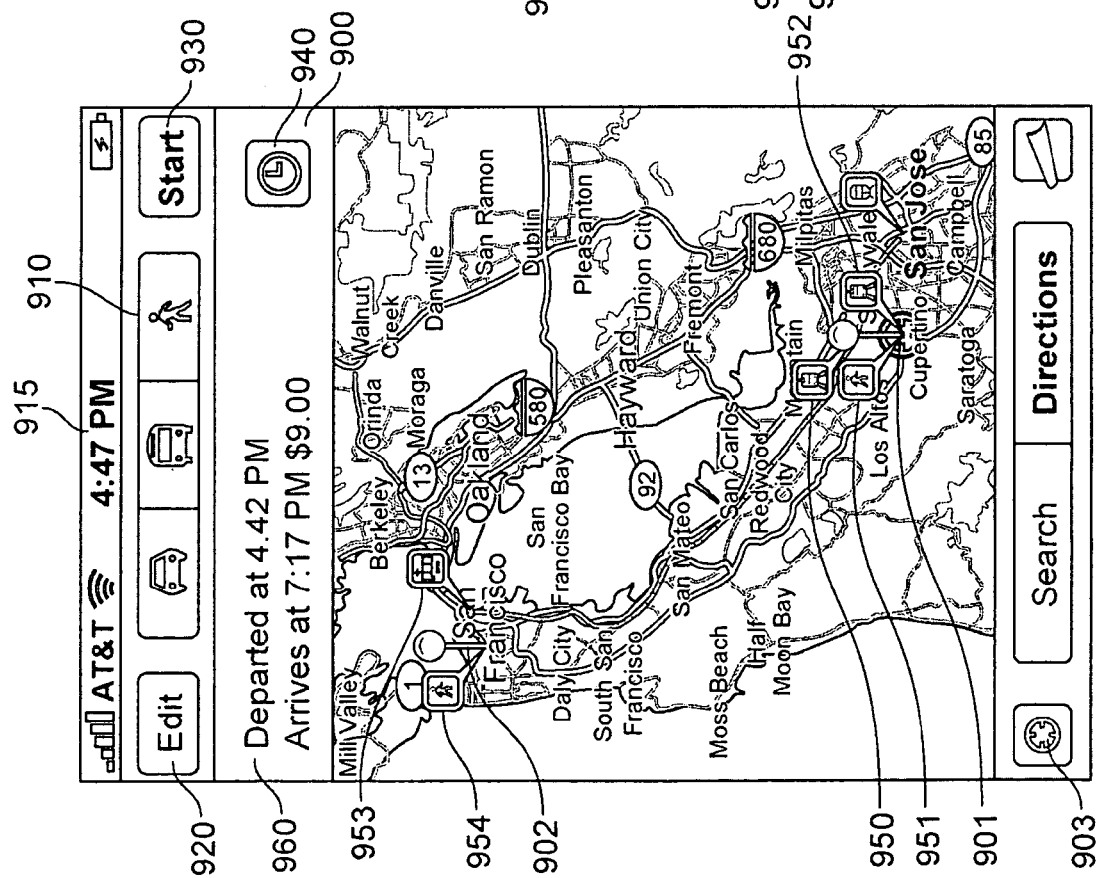

FIGS. 9A and 9B illustrate an example route overview interface 900 provided by a route picker application. In some implementations, the route overview interface 900 can comprise one or more of the following user interface elements, including: a placemark for a starting location 901, a placemark for a destination location 902, a user interface element 903 for invoking a self-locate function, a user interface element 910 for selecting a mode of transportation, a user interface element 915 (e.g., a clock button) showing the current time, a user interface element 920 for invoking an interface to edit the parameters used for route determination, a user interface element 930 for starting the transit steps, a user interface element 940 for displaying and setting an alarm clock, one or more user interface elements (route annotations) 950, 951, 952, 953, and 954 for identifying transit connections between transit steps along the route, and a user interface element 960 for displaying the information related to the route.

In some implementations, the user interface element 910 for selecting a mode of transportation can cause the user interface 900 to display a different set of transit routes while in transit mode. In some implementations, the user interface element 910 can show three choices for mode of transportation as a button showing a car graphic for "driving directions," a button showing a bus graphic for "public transit directions," and a button with a graphic of a person walking for "walking directions."

In some implementations, the user interface 940, or a "wheel of time" can, invoke a user interface of an alarm clock automatically set, or can be manually set, according to the transit schedules. In some implementations, the user interface element 960 for displaying the information related to the route can display information such as the departure time and arrival time of a particular route, and the cost for taking a particular route. In some implementations, the user element 960 can show a count down toward the departure time when the current time is close to the departure time of a suggested transit step. In some implementations, the user interface element 960 can show a departure time that has just passed.

In some implementations, the user interface 900 can display an annotation box for each connection between transit steps. In some implementations, a user can select an annotation box to get more information about a particular transit connection or transit step. In some implementations, an annotation box can comprise an annotation area and a leader connecting the annotation area to a location on the map. In some implementations, the annotation area can display annotation text, or annotation graphics. For example, in the user interface 900, the annotation boxes 950, 951, and 952 each have an annotation area displaying an icon for a particular type of transit means, such as train 950, foot 951, and bus 952. In some implementations, the annotation box has a default direction, i.e., the annotation area is at the upper right side of the location it is connected to via the leader. In some implementations, the annotation leader has a default length.

In some implementations, the annotations boxes are displayed on the user interface in a way to minimize cluttering. For example, in an area where several suggested connection steps for a route are closely spaced, the annotation boxes are automatically rearranged such that they do not overlap or the overlap is minimized. In some implementations, the annotation area of each new annotation box is flipped to an opposite side if it would otherwise overlap with an existing annotation box displayed on the user interface. In some implementations, the annotation area of each new annotation box is flipped to an opposite side if it would otherwise be too close to the existing annotation boxes, e.g., the distance between the annotation areas of the new and existing annotation boxes is below a threshold value. In some implementations, if a new annotation box would overlap an existing annotation box regardless of which side it is on, then it is placed on the side which would result in the least amount of overlap. In some implementations, the length of the leaders can be adjusted such that the annotation areas of the annotation boxes do not overlap or have the least amount of overlap.

In FIG. 9A, the user interface 900 shows that the default direction of the annotation boxes is to the right (e.g., annotation boxes 952 and 953), and annotation boxes 950, 951, and 954 have been flipped to the opposite side (the left) because they would otherwise overlap or be too close to annotation boxes 952 or 953, resulting in undesirable screen clutter. In FIG. 9B, the user interface shows a zoomed view of the transit overview map in FIG. 9A. In the zoomed transit overview map in FIG. 9B, annotation box 950 would not overlap or be too close to annotation box 952, therefore, annotation box 950 is displayed in its default direction (to the right).

Figure 10:
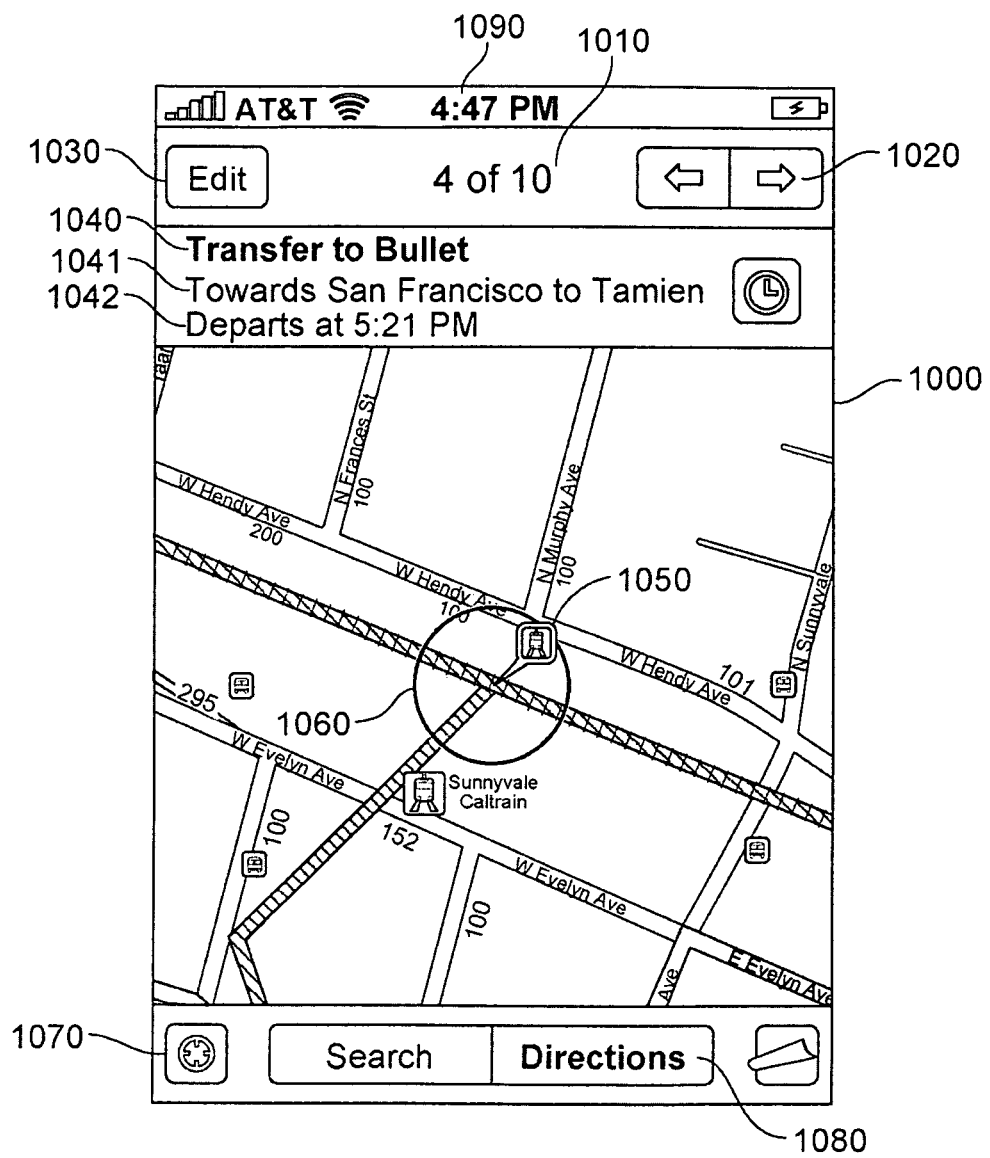
FIG. 10 is an illustrative example of a user interface for a transit step in a set of transit steps for a route.

FIG. 10 shows an illustrative user interface 1000 for presenting a suggested transit step in a selected route. In the user interface 1000, one or more of the following user interface elements can be presented, including: a text annotation 1010 for specifying an order of the current step being displayed among the total number of steps (e.g., step 4 of 10 steps), a user interface element 1020 for navigating forward and backward to the next or the previous step, a user interface element 1030 for invoking a user interface for editing the routing picking parameters, a set of user interface elements for route instructions such as the action to take 1040, the direction of the transportation 1041, and the departure time 1042, an annotation box 1050 for a connection point in the transit steps, and a user interface element 1060 for marking the connection point in the current transit step being displayed, a user interface element 1070 for invoking the "self-locate" function, and a user interface element 1080 for invoking the route picker interface to reroute.

In some implementations, route instructions such as the action to take 1040, the direction of the transportation 1041, and the departure time 1042 can be specified with user-friendly language, rather than just simple transit data. For example, if the raw data received from a transit server is simply the type of transportation (e.g., the "Bullet"), the direction (e.g., "Northbound", or "San Francisco to Tamien"), the time for departure (e.g., "5:21 PM"), the data is presented to the user in a more readable form by inserting appropriate verbs and prepositions. For example, verbs that can be inserted before the type of transportation can include "Take," "Transfer to," "Get off," "Walk to," and so on; prepositions that can be inserted before the direction information can include "Towards"; and verbs and prepositions that can be inserted before a departure time can be "Departs at."

In some implementations, the departure time can be displayed as a count down if the current time shown on the mobile device is close to the departure time, for example, within 10 minutes.

In some implementations, a reroute can be invoked by the user during a transit step. For example, when a user deviates from a particular step in the transit route, she can initiate a reroute calculation by selecting the user interface 1080 for directions and the route picker can automatically produce a new set of transit steps from the current location of the user. In some implementations, when a user missed a particular transit step by, for example, not making to it to particular destination on time, she can initiate a reroute by selecting the user interface 1080 for directions within the interface for that step (e.g., interface 1000 for step 4 of 10), and the route picker can recalculate the route based on the current location and time. In some implementations, the mobile device can automatically detect a deviation in location or time from a selected route. In some implementations, the mobile device can detect the current location of the mobile device via a positioning system on the mobile device, and determine if the user has deviated from the selected route. In some implementations, the mobile device can use the departure time, the current location of the mobile device, and the location of a particular transit step to determine whether the user has deviated from the selected route. In some implementations, the mobile device can automatically initiate a reroute to lead the user to the destination. In some implementations, the mobile device displays an alert to the user, and allows the user to decide whether to reroute.

Example Processes for Manipulation of Panoramas and Transit Directions

Figure 11:
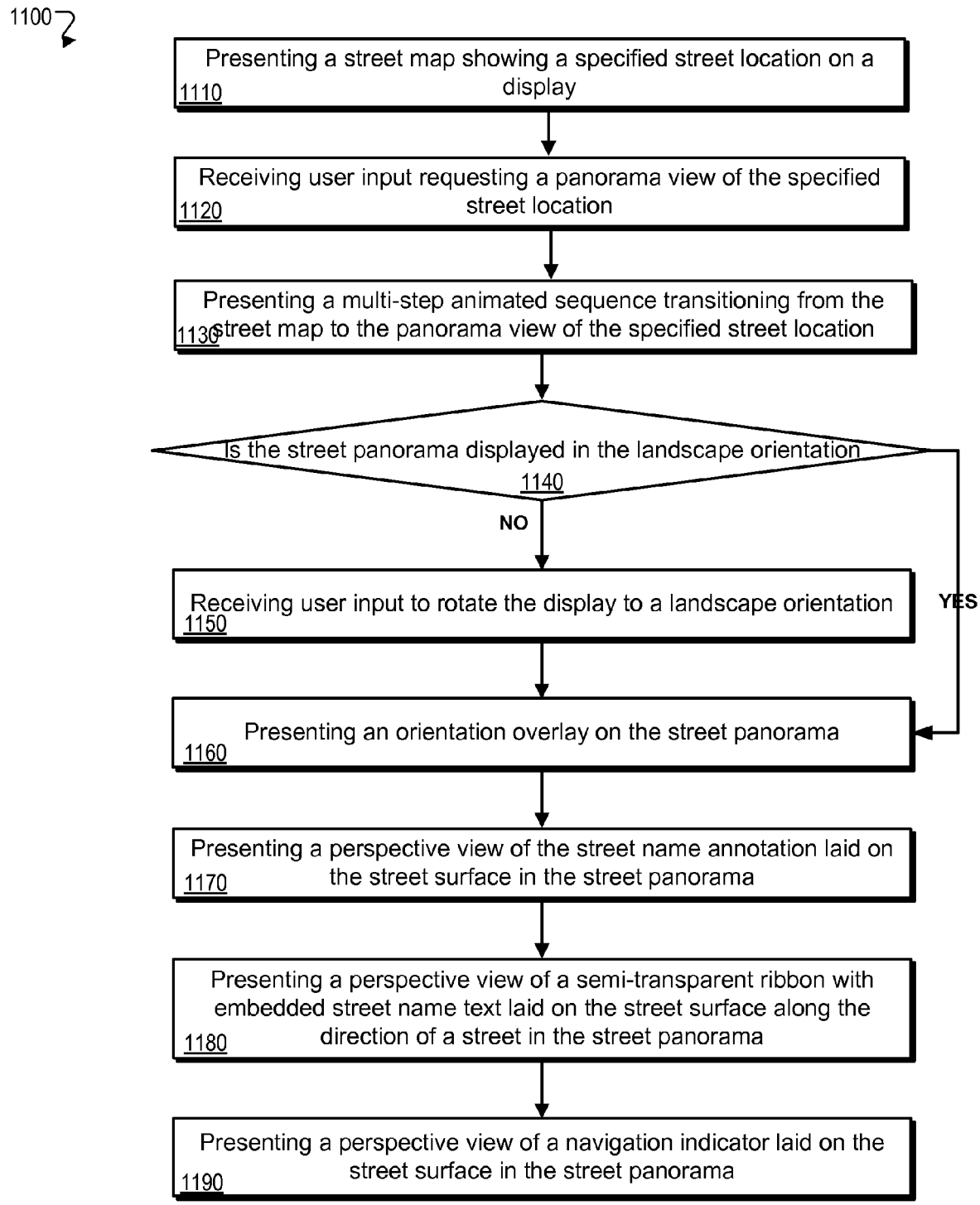
FIG. 11 is a flow diagram of an example process for transitioning from a street map view to a panoramic view of a specified street location, and displaying one or more user interface elements on the street panorama to facilitate user interaction with the street panorama.

FIG. 11 is a flow diagram of an example process 1100 for transitioning from a street map view to a panoramic street view of a specified street location, and displaying one or more user interface elements on the street view panorama of the specified street location to facilitate user interaction with the street view panorama. The process 1100 can comprise: a step 1110 for presenting a street map showing a specified street location on a display of a mobile device 100; a step 1120 for receiving user input requesting a panorama view of the specified street location; a step 1130 for presenting an animated sequence transitioning from the street map view to the panorama view of the specified street location; a step 1140 for determining whether the street panorama is displayed in the landscape orientation; a step 1150 for receiving a user input to rotate the display to a landscape orientation if the street panorama is not displayed in the landscape orientation at the completion of the animated sequence; a step 1160 for presenting an orientation overlay on the street panorama displayed in the landscape orientation; a step 1170 presenting a perspective view of the street name annotation laid on a street surface in the street panorama, or alternative to the step 170; a step 1180 for presenting a perspective view of a semi-transparent transparent ribbon with embedded street name text, laid on the street surface along the direction of a street in the street panorama; and a step 1190 for presenting a perspective view of a navigation indicator laid on the street surface in the street panorama.

In some implementations, the orientation overlay presented in the step 1160 indicates a direction and an angular extent of the field of view of the street panorama on display. In some implementations, the step 1110 for presenting a street map showing a specified street location on a display further comprises a step for presenting a visual indicator at the specified street location on the street map, and presenting a user interface element for invoking the panorama view of the specified street location. In some implementations, the visual indicator displayed at the specified street location is depicted as a push pin, and the user interface element for invoking the panorama view of the street location also shows the street address of the specified street location.

In some implementations, the step 1180 for presenting a perspective view of a semi-transparent transparent ribbon with embedded street name text, laid on the street surface along the direction of a street in the street panorama can include a step for presenting the semi-transparent ribbon and a step for presenting the embedded text on the semi-transparent ribbon. In some implementations, a user input directed to the navigation indicator presented in step 1190 causes the street panorama to advance in a direction pointed by the navigation indicator.

Figure 12A:
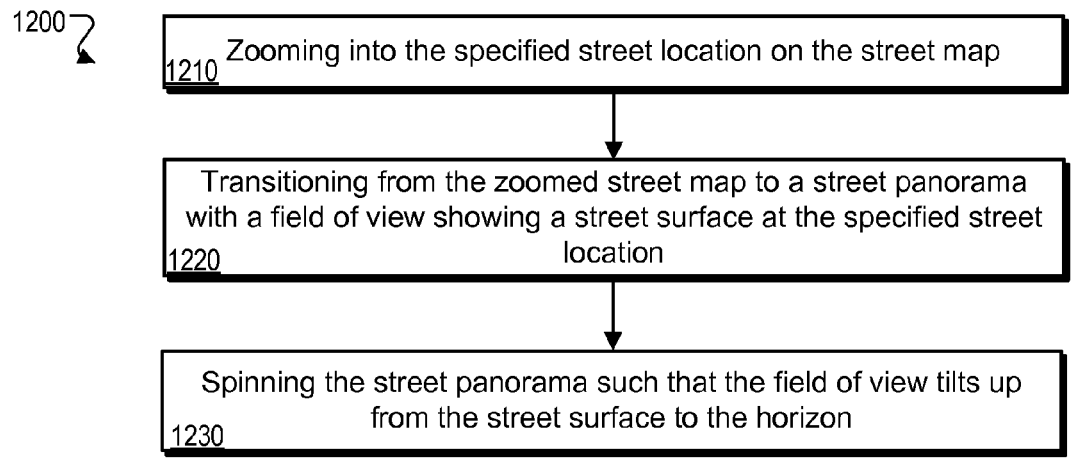
FIG. 12A is a flow diagram of an example animated sequence.

FIG. 12A is a flow diagram of an example multi-step animated sequence 1200 presented in step 1130 of FIG. 11. The animated sequence 1200 comprises: a step 1210 for zooming into the specified street location on the street map, a step 1220 for transitioning from the zoomed street map to a street panorama with a field of view showing a street surface at the specified street location, and a step 1230 for spinning the street panorama such that the field of view tilts up from the street surface to the horizon.

Figure 12B:
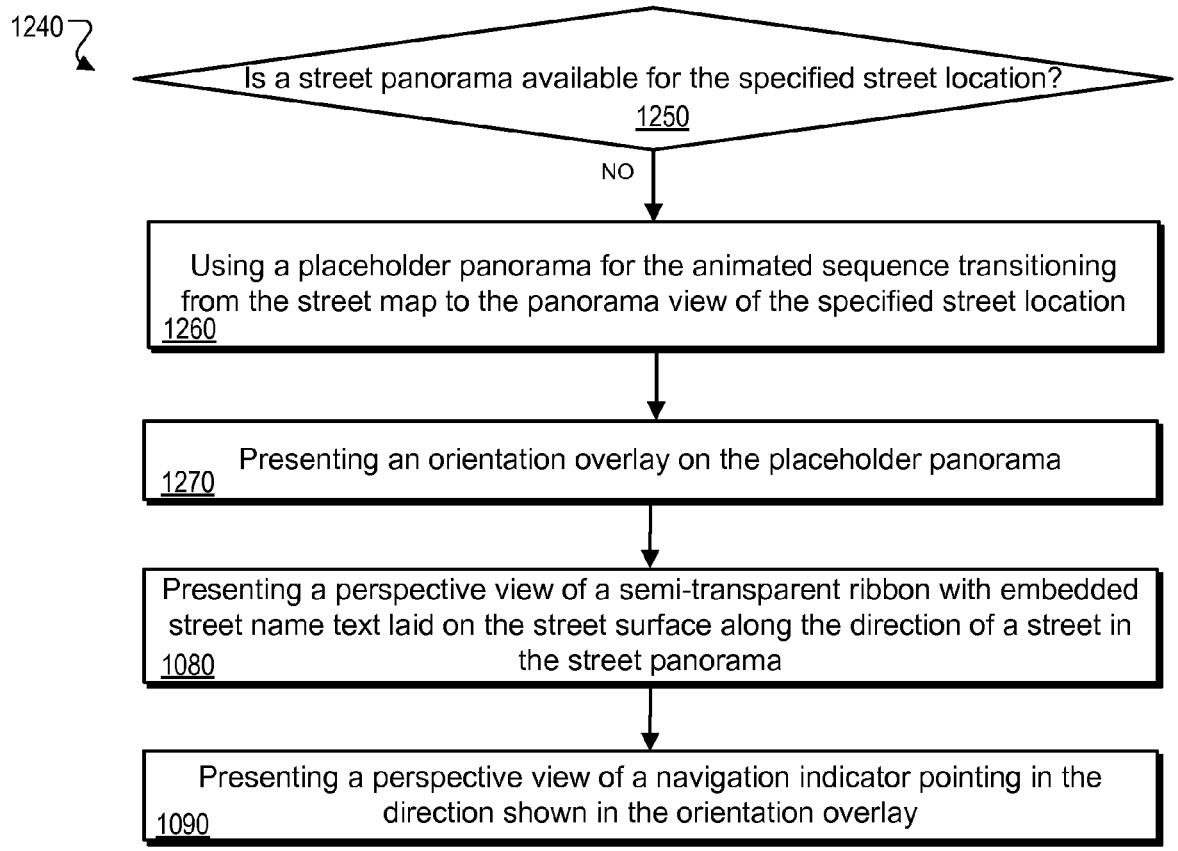
FIG. 12B is a flow diagram of an example process for using a placeholder panorama in place of an absent street panorama.

FIG. 12B is a flow diagram of an example process for using a placeholder panorama in animation sequences, in the panorama view, and in panorama navigation, when street panorama data for a particular street location is not available. The example process 1240 comprises: a step 1250 for determining whether a street panorama is available for the specified street location; a step 1260 for using a placeholder panorama for the animated sequence when the street panorama is not available; a step 1270 for presenting an orientation overlay on the placeholder panorama where the orientation overlay indicates a direction and an angular extent of the field of view; a step 1280 for presenting a perspective view of a street name annotation (such as the semi-transparent ribbon and embedded street name text); and a step 1290 for presenting a perspective view of a navigation indicator pointing in the direction shown in the orientation overlay.

Figure 13:
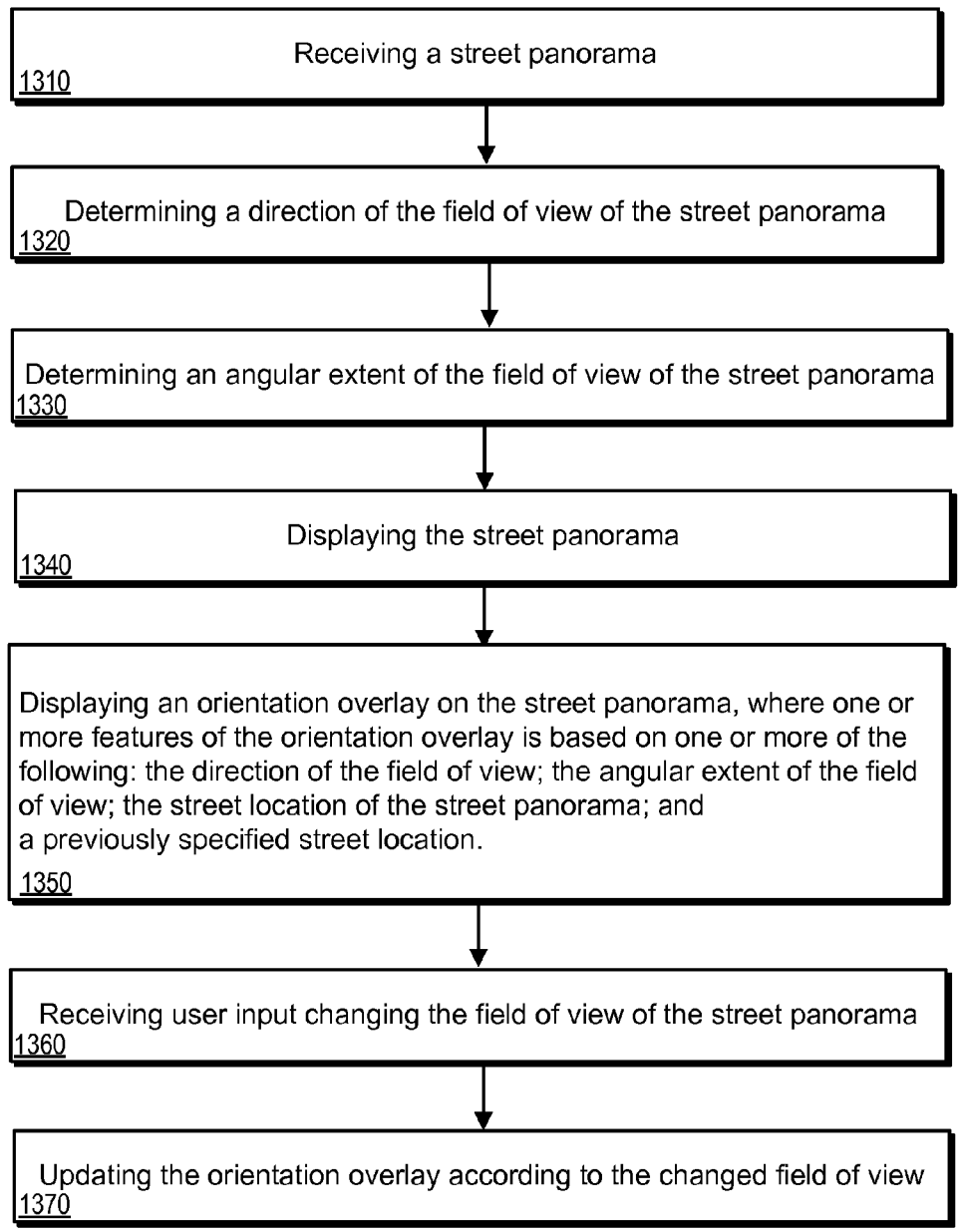
FIG. 13 is a flow diagram of an example process presenting an orientation overlay on a street panorama.

FIG. 13 is a flow diagram of an example process 1300 for presenting an orientation overlay on a street panorama. The example process 1300 comprises: a step 1310 for receiving a street panorama; a step 1320 for determining a direction of the field of view of the street panorama; a step 1330 for determining an angular extent of the field of view of the street panorama; a step 1340 for displaying the street panorama (e.g., on a mobile device); a step 1350 for displaying an orientation overlay on the street panorama, where one or more features of the orientation overlay is based on one or more of: the direction of the field of view, the angular extent of the field of view, the street location of the street panorama, and a previously specified street location; a step 1360 for receiving user input changing the field of view of the street panorama, and a step 1370 for updating the orientation overlay according to the changed field of view.

In some implementations, the orientation overlay shows the direction and angular extent of the field of view, the street location of the street panorama, and the specified street location on a portion of a street map. In some implementations, the orientation overlay includes a visual indicator such as a push pin to indicate the specified street location on the portion of the street map. In some implementations, the orientation overlay is a pie-shaped indicator where an angle of a pie slice in the pie-shaped indicator opens in the direction of the field of view and has a size determined based on the angular extent of the field of view. In some implementations, when a second street panorama is displayed, such as when a user navigates to a panorama at an adjacent street location, the process can further comprise a step for updating the orientation overlay to reflect the location, direction of the field of view, and angular extent of the field of view. In some implementations, the presenting the orientation overlay further comprises presenting a pie-shaped indicator where a vertex of a pie-slice in the pie-shaped indicator overlaps with the specified street location of the street panorama on the street map enclosed by the pie-shaped indicator, and upon displaying a second street panorama at a different street location, updating the pie-shaped indicator such that a different portion of the street map is displayed within the pie-shaped indicator and the vertex of the pie-slice now overlaps with the street location of the second street panorama.

Figure 14A:
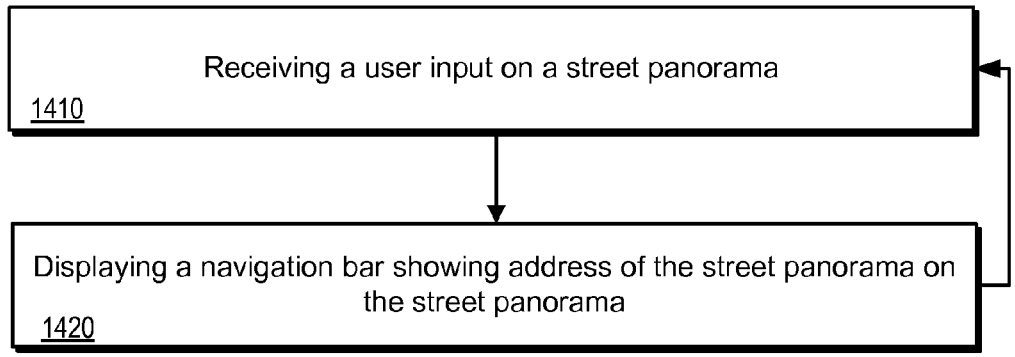
FIG. 14A is a flow diagram of an example process for displaying a navigation bar on a street panorama in response to user input.

FIG. 14A is a flow diagram of an example process 1400 for displaying a navigation bar on a street panorama in response to user input. The example process 1400 comprises: a step 1410 for receiving a user input on a street panorama presented on a touch-sensitive display of a mobile device, and a step 1420 for displaying a navigation bar showing an address of the street panorama on the street panorama.

In some implementations, when a user navigates to a second street panorama from the first panorama, the process can further comprise: a step for updating the navigation bar to show the address of the second street panorama.

Figure 14B:
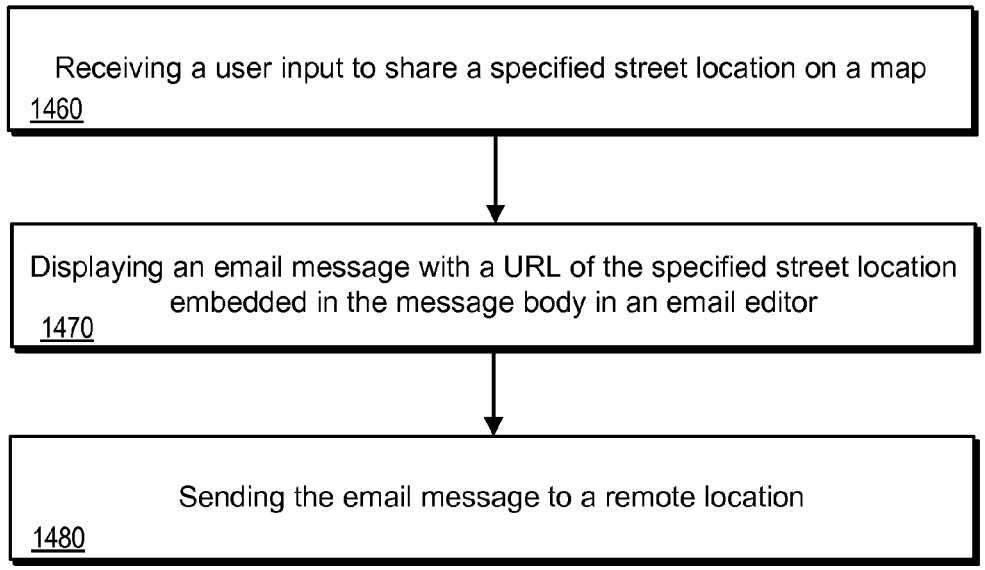
FIG. 14B is a flow diagram of an example process for sharing a specified location on a street map with another user at a remote location

FIG. 14B is a flow diagram of an example process 1450 for sharing a specified location on a street map with another user at a remote location. The example process 1450 comprises: a step 1460 for receiving a user input to share a specified street location on a map, a step 1470 for displaying a message (e.g., an email message) with a URL of the specified street location embedded in the message body in an message editor, and a step 1480 of sending the message to a remote location.

In some implementations, the process further comprises: presenting a first user interface showing a street location on a street map; responsive to a user input for information about the street location, presenting a second user interface showing address information of the street location and a user interface element for sharing the street location.

Figure 15A:
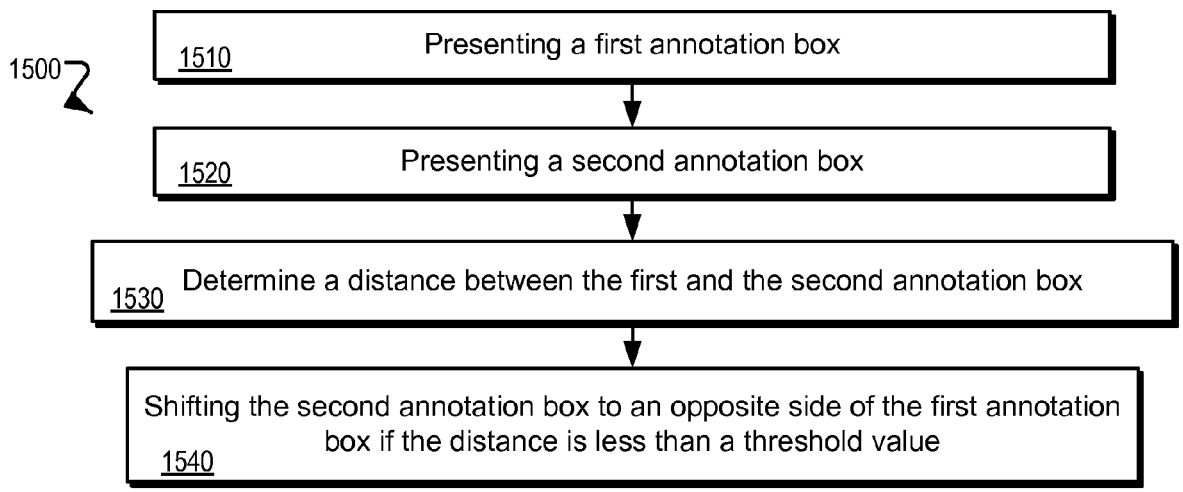
FIG. 15A is a flow diagram of an example process for adjusting positions of annotation boxes along a transit route on a map to minimize cluttering.

FIG. 15A is a flow diagram of an example process 1500 for adjusting positions of annotation boxes along a transit route on a map to minimize cluttering. The example process 1500 comprises: a step 1510 for presenting a first annotation box on the map; where the first annotation box is connected to a first location on the map by a leader; a step 1520 for presenting a second annotation box on the map, where the second annotation box is connected to a second location on the map by a leader; a step 1530 for determining a distance between the first and the second annotation boxes; and a step 1540 for shifting the second annotation box to an opposite side of the first annotation box if the determined distance is less than a threshold value. In some implementations, the threshold value is zero, e.g., shifting the second annotation box to an opposite side if it overlaps with the first annotation box.

In some implementations, the step 1540 further comprises: shifting the second annotation box to an opposite side of the first annotation box only if the shifting does not create an overlap between the second annotation box and a third annotation box. In some implementations, the step 1540 further comprises: shifting the second annotation box only if the shifting reduces the amount of overlapping with other annotation boxes present on the map. In some implementations, instead of shifting the annotation box to an opposite side, the process can comprise extending the leader of an annotation box for a distance such that the annotation box does not overlap with another annotation box present on the map.

Figure 15B:
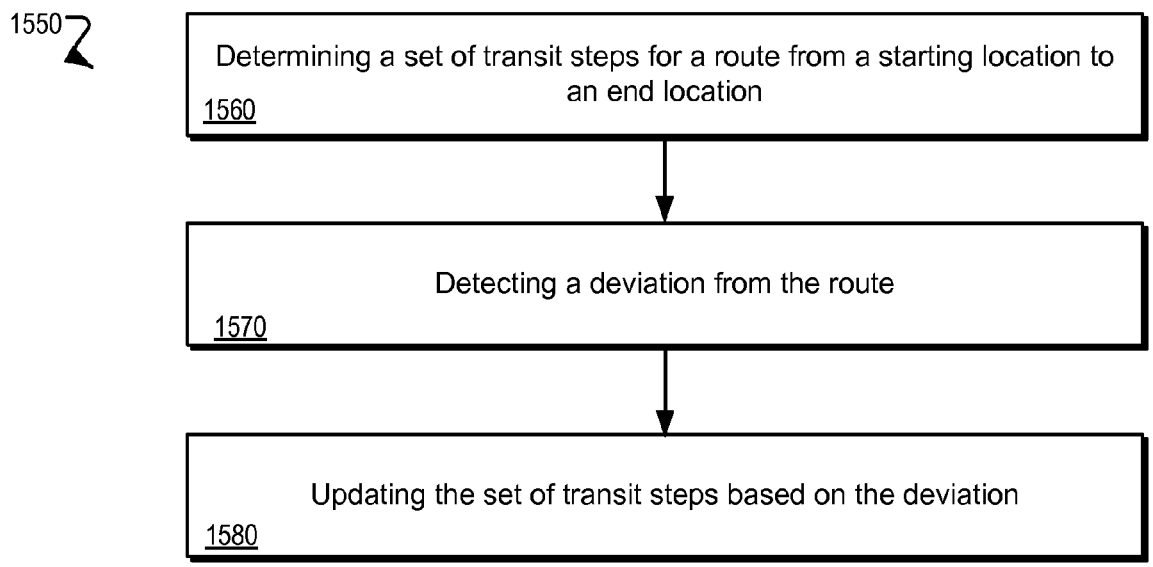
FIG. 15B is a flow diagram of an example process for rerouting based on a deviation from a predetermined route.

FIG. 15B is a flow diagram of an example process 1550 for rerouting based on a deviation from a predetermined route. The example process 1550 comprises: a step 1560 for determining a set of transit routes from a starting location to an end location, a step 1570 for detecting a deviation from a route, and a step 1580 for updating the set of transit steps based on the deviation.

In some implementations, the process can further comprise: a step for receiving input specifying the start location and the end location on a mobile device. In some implementations, the set of transit steps comprises at least one of embarking on a public transportation means, walking, or biking. In some implementations, detecting a deviation from the route can further comprise: receiving a user input requesting a reroute, receiving a current location of the mobile device or a current time; and determining the deviation from the set of transit steps based on the current location or the current time. In some implementations, detecting a deviation from the route further comprises: receiving a current location of the mobile device or a current time, determining a deviation from the set of transit steps based on the current location or current time. In some implementations, receiving a current location further comprises: requesting and receiving the current location of the mobile device using a Global Positioning System on the mobile device.

Example Positioning System

Figure 16:
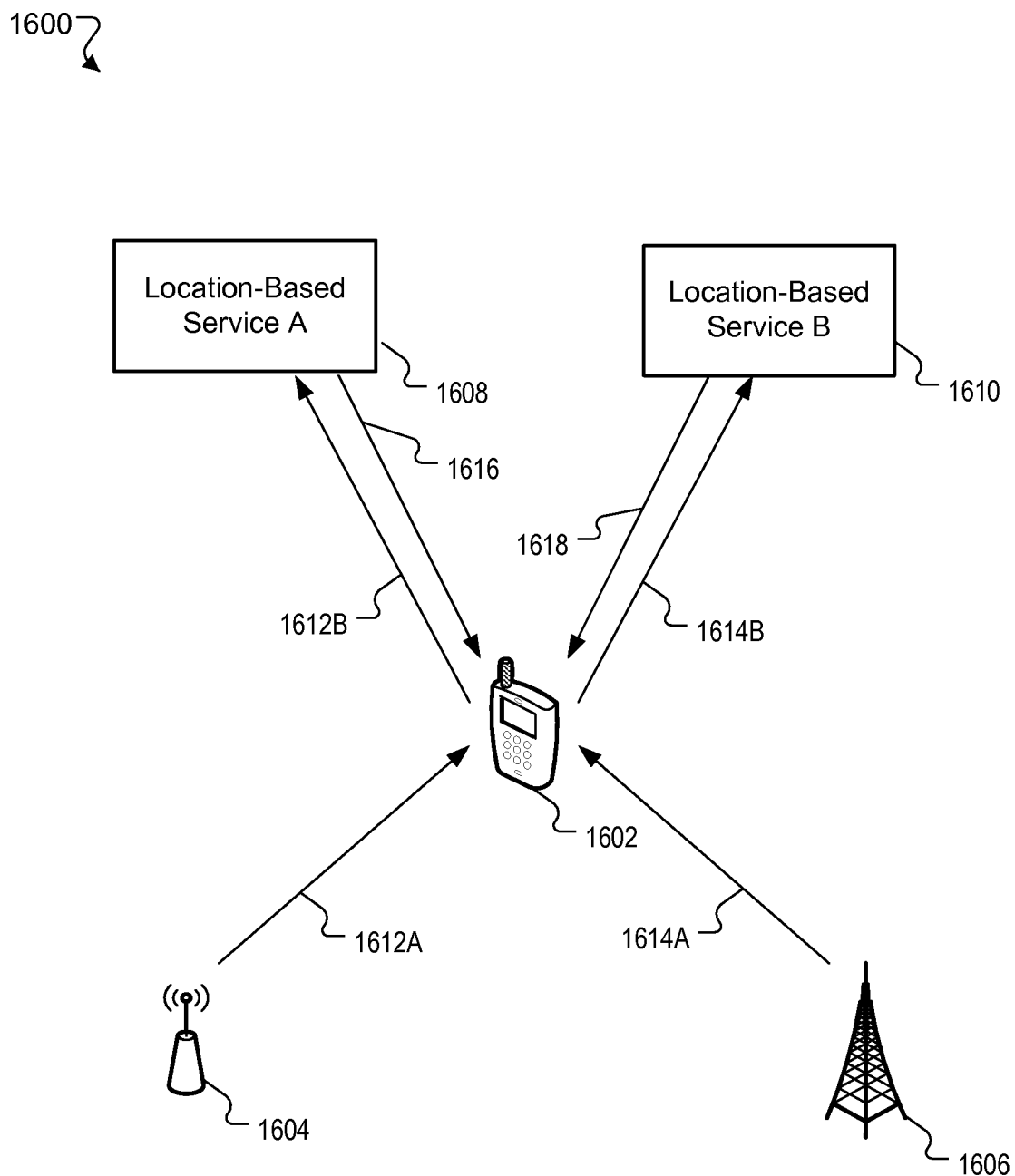
FIG. 16 illustrates an example positioning system which can be used with the mobile device of FIG. 1.

FIG. 16 illustrates an example positioning system which can be used with the mobile device 100 of FIG. 1. In FIG. 16, mobile device 1602 can represent mobile device 100. The mobile device 1602 can, for example, communicate to one or more network access points 1604 (e.g., Wi-Fi base station devices) or one or more cell towers 1606. In some implementations, the access points 1604 can be any combination of 802.11b/g wireless routers, 802.11n wireless routers, and some other Wi-Fi devices that implement any suitable Wi-Fi or other wireless networking technology or protocol (e.g., GPS protocol). Using the communication with the access points 1604 or the cell towers 1606, a location-based service 1608 (Location-Based Service A) or a location-based service 1610 (Location-Based Service B) can estimate geographic areas where the mobile device 1602 is currently located. The actual location of the mobile device 1602 can be anywhere within the estimated geographic area. An estimated geographic area is not necessarily circular but can be indicated as a circular area on a map display for convenience.

The mobile device 1602 can, for example, receive a communication 1612A from an access point 1604 (e.g., a Wi-Fi access point). The communication 1612A can include information about the access point 1604, e.g., the Internet Protocol (IP) address and/or the Media Access Control (MAC) address of the access point 1604. The communication 1612A can include other information, such as the latitude and longitude of the access point 1604. The information received in communication 1612A can be sent to the location-based service 1608 in communication 1612B. The location-based service 1608 can, for example, with a degree of uncertainty or error, estimate a first geographic area in which the mobile device 1602 is currently located using the information sent in communication 1612B. In some implementations, the location-based service 1608 is a system or service that estimates, with some degree of uncertainty or error, the position of a device using a database of access points mapped to geographic locations. The accuracy or precision (or the degree of uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device).

In some implementations, the accuracy or precision of the estimated position is stated in units of distance (e.g., "the estimated position is accurate up to 50 meters"). That is, the actual position of the mobile device 1602 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 1602 or a central reference database at location-based service 1608 via network communication (e.g. communication 1612B can be sent to the location-based service 1608). The location-based service 1608 can use the unique signatures to estimate the latitude and longitude of the center of the first geographic circle with an m meter radius (e.g., about 20 meters).

In some implementations, location-based service 1608 includes positioning services and reference database information provided by SKYHOOK WIRELESS of Boston, Mass.

The mobile device 1602 can receive a communication 1614A from cell tower 1606. The cell communication 1614A can include, for example, information identifying the cell tower 1606. In some implementations, the cell communication 1614A can also include the latitude and longitude of the cell tower 1606. The identifying information and/or the latitude and longitude of the cell tower 1606 can be sent to the location-based service 1610 in communication 1614B. The location-based service 1610 can estimate a position of the mobile device 1602 using the information included in communication 1614B and estimate an accuracy of the estimate position. Thus, for example, the location-based service 1610 can estimate a second geographic area in which the mobile device 1602 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples.

In some implementations, the position and the geographic area of the mobile device 1602 can be estimated using a "cell of origin" positioning technology. In some other implementations, the second geographic area can be determined by cell tower triangulation.

The first and second geographic areas can be sent to the mobile device 1602 by communications 1616 and 1618, respectively. The mobile device 1602 can present, on the touch-sensitive display 102 for example, a map view including an indication of one of the geographic areas if that one is entirely contained within the other geographic area (including the case where the boundaries of the geographic areas touch but otherwise no part of the one of the geographic area is outside of the other geographic area). For example, a map view that includes an indication of the first geographic area can be presented if the first geographic area is completely contained within the second geographic area. The mobile device 1602 can present a map view that includes an indication of the second geographic area if the first geographic area is not completely contained within the second geographic area. For example, if the technology, system, or service used to estimate the first geographic area has a greater level of accuracy or precision detail than the technology, system, or service used to estimate the second geographic area, and the first geographic area is determined to be more accurate or precise based on the first geographic area being entirely within the second geographic area, the mobile device 1602 can use the first geographic area. The level of detail of the technology can, for example, be determined by a priority table stored in the mobile device 1602.

In another example, the first geographic area can be estimated using the access point 1604, and the second geographic area can be estimated using the cell tower 1606. In this example, the access point 1604 was moved from its original location and the latitude and longitude coordinates of the access point 1604 as they are known to location-based service 1608 are incorrect and the mobile device 1602 is not actually located within the first geographic area. The cell tower 1606 provided correct location-based data and the mobile device 1602 is located within the second geographic area. In this situation, the first and second geographic areas do not overlap, so the mobile device 1602 would display a map view indicating the second geographic area. The mobile device 1602 can be used to determine the accuracy of the first and second geographic areas, or an external server or servers can be used.

The location-based service 1608 and location-based service 1610 can run on the same device or on separate devices. For example, the location-based services 1608 and 1610 can run on servers communicating with the mobile device 100 through a network (e.g., WAN 214). The servers can be separate servers or the same server. The location-based services 1608 and 1610 can alternatively run on the mobile device 1602.

The mobile device 1602 can, for example, connect to additional devices or services (not shown) for location-based services, instead of, or in addition to the access point 1604 and the cell tower 1606. Such devices or services could include a Bluetooth™ device, GPS, radio or TV towers, or cellular grids, to name a few examples. For example, the mobile device 1602 can connect to peer devices with the Bluetooth™ communication device 188 (FIG. 1) and receive location-based information from other mobile devices and/or Bluetooth™ enabled devices. In some implementations, the mobile device 1602 can determine or estimate its position and/or geographic area using other technologies (e.g., GPS). In some implementations, the geographic area determined or estimated using any of these other technologies can be used (e.g., displayed) in lieu of the geographic area estimated using location-based services 1608 or 1610 (e.g., Wi-Fi or cellular positioning techniques) if the geographic area determined or estimated using the other technologies is contained entirely within the geographic area estimated using location-based services 1608 or 1610 and if the other technologies are more accurate or precise according to the priority table stored in the mobile device 1602.

Example Network Operating Environment

Figure 17:
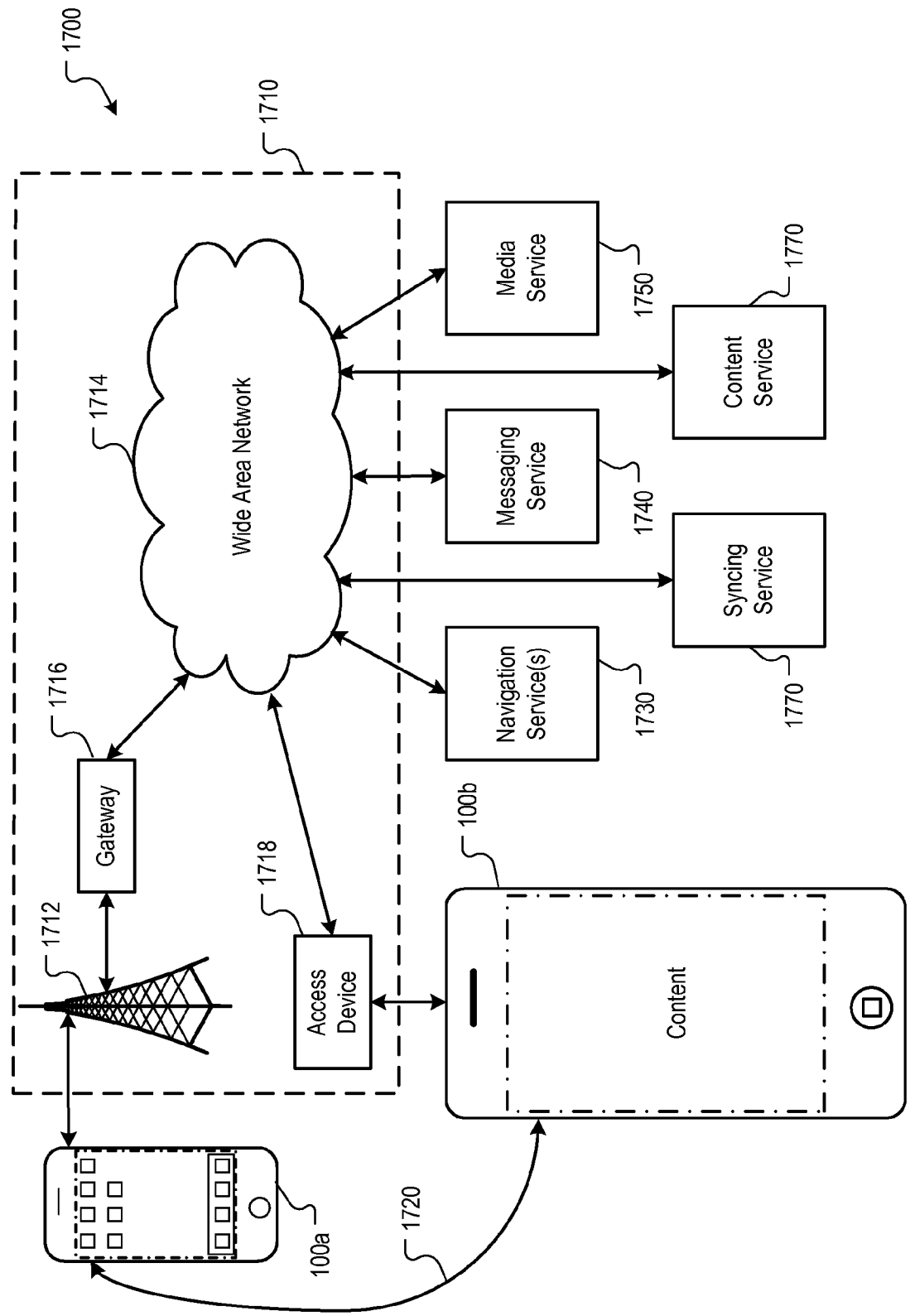
FIG. 17 is a block diagram of an example of a mobile device operating environment.

FIG. 17 is a block diagram 1700 of an example of a mobile device operating environment. The mobile device 100 of FIG. 1 (shown as 100a or 100b here) can, for example, communicate over one or more wired and/or wireless networks 1710 in data communication. For example, a wireless network 1712 (e.g., a cellular network), can communicate with a wide area network (WAN) 1714, such as the Internet, by use of a gateway 1716. Likewise, an access point 1718, such as an 802.11g wireless access point, can provide communication access to the wide area network 1714. In some implementations, both voice and data communications can be established over the wireless network 1712 and the access point 1718. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 1712, gateway 1716, and wide area network 1714 (e.g., using TCP/IP or UDP protocols). Likewise, the mobile device 100b can place and receive phone calls, send and receive e-mail messages, and retrieve electronic documents over the access point 1718 and the wide area network 1714. In some implementations, the mobile device 100b can be physically connected to the access point 1718 using one or more cables and the access point 1718 can be a personal computer. In this configuration, the mobile device 100 can be referred to as a "tethered" device.

The mobile devices 100a and 100b can also establish communications by other means (e.g., wireless communications). For example, the mobile device 100a can communicate with other mobile devices (e.g., other wireless devices, cell phones, etc.), over the wireless network 1712. Likewise, the mobile devices 100a and 100b can establish peer-to-peer communications 1720 (e.g., a personal area network), by use of one or more communication subsystems (e.g., a Bluetooth™ communication device). Other communication protocols and topologies can also be implemented.

The mobile device 100a or 100b can, for example, communicate with one or more services 1730, 1740, 1750, 1760, and 1770 over the one or more wired and/or wireless networks 1710. For example, a navigation service 1730 can provide navigation information (e.g., map information, location information, route information, and other information), to the mobile device 100a or 100b. Access to a service can be provided by invocation of an appropriate application or functionality on the mobile device. For example, to invoke the navigation service 1730, a user can invoke a Maps function or application by touching the Maps object 114 depicted in FIG. 1. A messaging service 1740 can, for example, provide e-mail and/or other messaging services. A media service 1750 can, for example, provide access to media files, such as song files, movie files, video clips, and other media data. A syncing service 1760 can, for example, perform syncing services (e.g., sync files). A content service 1770 can, for example, provide access to content publishers such as news sites, RSS feeds, web sites, blogs, social networking sites, developer networks, etc. Other services can also be provided, including a software update service that automatically determines whether software updates exist for software on the mobile device, then downloads the software updates to the mobile device where it can be manually or automatically unpacked and/or installed.

Example Mobile Device Architecture

Figure 18:
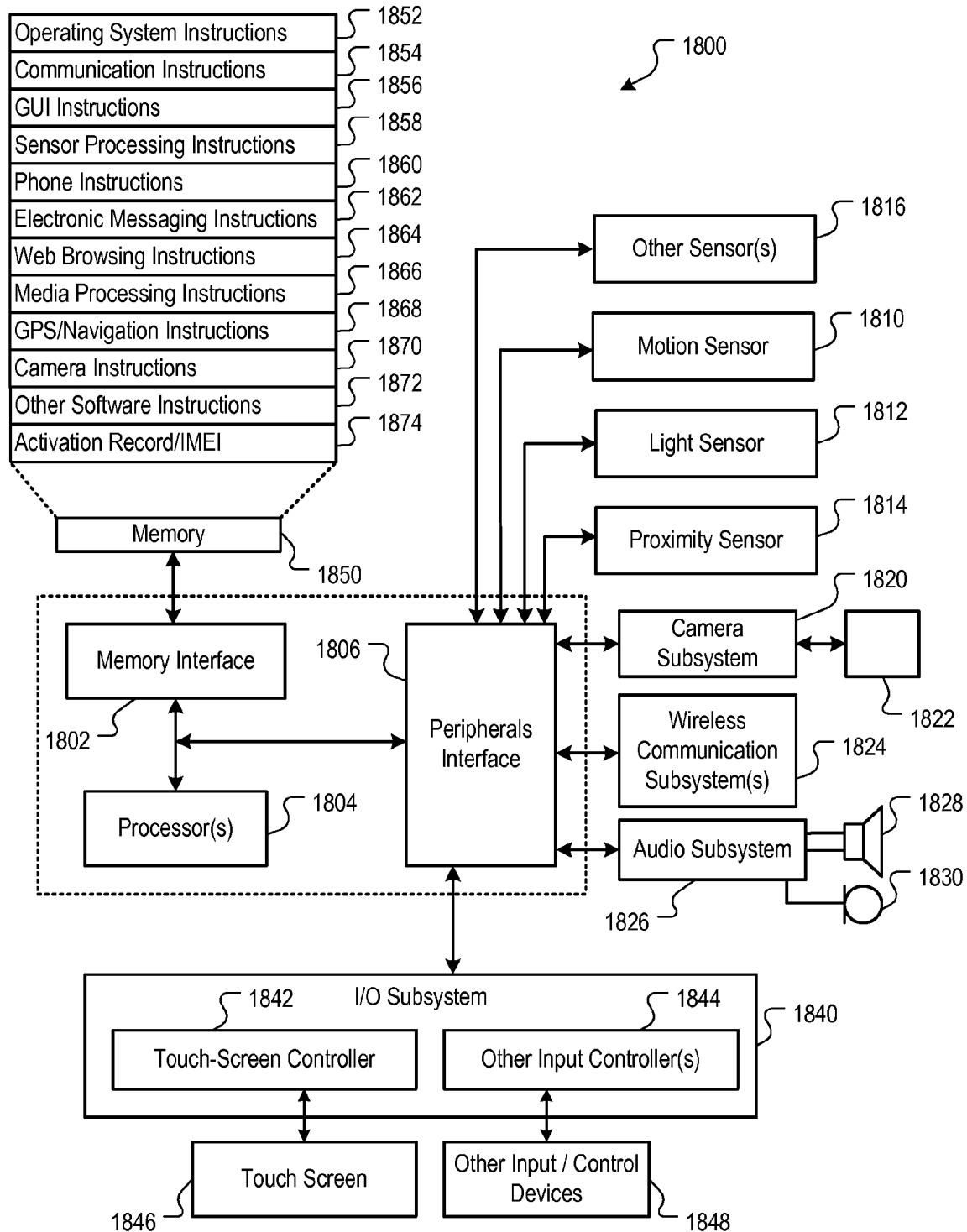
FIG. 18 is a block diagram of an example implementation of the mobile device of FIG. 1.

FIG. 18 is a block diagram 1800 of an example implementation of the mobile device 100 of FIG. 1. The mobile device 100 can include a memory interface 1802, one or more data processors, image processors and/or central processing units 1804, and a peripherals interface 1806. The memory interface 1802, the one or more processors 1804 and/or the peripherals interface 1806 can be separate components or can be integrated in one or more integrated circuits. The various components in the mobile device 100 can be coupled by one or more communication buses or signal lines.

Sensors, devices, and subsystems can be coupled to the peripherals interface 1806 to facilitate multiple functionalities. For example, a motion sensor 1810, a light sensor 1812, and a proximity sensor 1814 can be coupled to the peripherals interface 1806 to facilitate orientation, lighting, and proximity functions. Other sensors 1816 can also be connected to the peripherals interface 1806, such as a positioning system (e.g., GPS receiver), a temperature sensor, a biometric sensor, or other sensing device, to facilitate related functionalities.

A camera subsystem 1820 and an optical sensor 1822 (e.g., a charged coupled device (CCD) or a complementary metal-oxide semiconductor (CMOS) optical sensor), can be utilized to facilitate camera functions, such as recording photographs and video clips.

Communication functions can be facilitated through one or more wireless communication subsystems 1824, which can include radio frequency receivers and transmitters and/or optical (e.g., infrared) receivers and transmitters. The specific design and implementation of the communication subsystem 1824 can depend on the communication network(s) over which the mobile device 100 is intended to operate. For example, a mobile device 100 may include communication subsystems 1824 designed to operate over a GSM network, a GPRS network, an EDGE network, a Wi-Fi or WiMax network, and a Bluetooth™ network. In particular, the wireless communication subsystems 1824 may include hosting protocols such that the device 100 may be configured as a base station for other wireless devices.

An audio subsystem 1826 can be coupled to a speaker 1828 and a microphone 1830 to facilitate voice-enabled functions, such as voice recognition, voice replication, digital recording, and telephony functions.

The I/O subsystem 1840 can include a touch screen controller 1842 and/or other input controller(s) 1844. The touch-screen controller 1842 can be coupled to a touch screen 1846. The touch screen 1846 and touch screen controller 1842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1846.

The other input controller(s) 1844 can be coupled to other input/control devices 1848, such as one or more buttons, rocker switches, thumb-wheel, infrared port, USB port, and/or a pointer device such as a stylus. The one or more buttons (not shown) can include an up/down button for volume control of the speaker 1828 and/or the microphone 1830.

In one implementation, a pressing of the button for a first duration may disengage a lock of the touch screen 1846; and a pressing of the button for a second duration that is longer than the first duration may turn power to the mobile device 100 on or off. The user may be able to customize a functionality of one or more of the buttons. The touch screen 1846 can, for example, also be used to implement virtual or soft buttons and/or a keypad or keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 30-pin dock connector that is compatible with the iPod. Other input/output and control devices can also be used.

The memory interface 1802 can be coupled to memory 1850. The memory 1850 can include high-speed random access memory and/or non-volatile memory, such as one or more magnetic disk storage devices, one or more optical storage devices, and/or flash memory (e.g., NAND, NOR). The memory 1850 can store an operating system 1852, such as Darwin, RTXC, LINUX, UNIX, OS X, WINDOWS, or an embedded operating system such as VxWorks. The operating system 1852 may include instructions for handling basic system services and for performing hardware dependent tasks.

The memory 1850 may also store communication instructions 1854 to facilitate communicating with one or more additional devices, one or more computers and/or one or more servers. The memory 1850 may include graphical user interface instructions 1856 to facilitate graphic user interface processing. For example, the graphical user interfaces described with respect to FIGS. 1-10 can be implemented with graphic user interface instructions 1856. The memory 1850 may also include sensor processing instructions 1858 to facilitate sensor-related processing and functions; phone instructions 1860 to facilitate phone-related processes and functions; electronic messaging instructions 1862 to facilitate electronic-messaging related processes and functions; web browsing instructions 1864 to facilitate web browsing-related processes and functions; media processing instructions 1866 to facilitate media processing-related processes and functions; GPS/Navigation instructions 1868 to facilitate GPS and navigation-related processes and instructions; camera instructions 1870 to facilitate camera-related processes and functions; and/or other icon process instructions 1872 to facilitate processes and functions.

Each of the above identified instructions and applications can correspond to a set of instructions for performing one or more functions described above. These instructions need not be implemented as separate software programs, procedures, or modules. The memory 1850 can include additional instructions or fewer instructions. Furthermore, various functions of the mobile device 100 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a composition of matter capable of effecting a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
providing for display a panoramic view, the panoramic view including a view from a geographic location;
overlaying on the panoramic view an orientation indicator, the orientation indicator comprising a map that includes the geographic location, the map having a dark portion and a highlighted portion, the highlighted portion being geometrically defined by an angled wedge, wherein:
a vertex of the angled wedge corresponds to the geographic location;
the angle of the wedge opens in a direction corresponding to a field of view of the panoramic view from the geographic location; and
the highlighted portion of the map displays geographic features in the highlighted portion brighter than geographic features displayed in the dark portion of the map; and
in response to a change of field of view of the panoramic view, changing the opening direction or a magnitude of the angle, wherein the method is performed by a computing device;
wherein the orientation indicator indicates the field of view of the panoramic view such that at least one geographic feature in the highlighted portion of the map corresponds to at least one geographic feature visible in the panoramic view and at least one geographic feature in the dark portion of the map corresponds to at least one geographic feature not visible in the panoramic view.

2. The method of claim 1, wherein
the map and the panoramic view are both displayed in a landscape orientation.

3. The method of claim 2, further comprising:
providing for display an animated sequence transitioning from a map view of the geographic location to the panoramic view of the geographic location, where the animated sequence comprises:
zooming into the geographic location on the map view;
transitioning from the zoomed map view to the panoramic view, wherein the panoramic view has a field of view showing a street surface at the geographic location; and
spinning the panoramic view such that the field of view tilts up from the street surface to a horizon.

4. The method of claim 1, wherein
the map and the panoramic view are both displayed in a portrait orientation, and the method further comprises:
receiving a user input rotating the panoramic view and the map to a landscape orientation.

5. The method of claim 1, comprising presenting a map view of the geographic location, wherein
presenting the map comprises:
presenting a visual indicator at the geographic location on the map; and
presenting a user interface element for invoking the panoramic view of the geographic location.

6. The method of claim 5, wherein
the visual indicator depicts a push pin; and
the user interface element displays a street address of the geographic location.

7. The method of claim 1, further comprising:
presenting a perspective view of a street name annotation laid on a street surface in the panoramic view.

8. The method of claim 1, further comprising:
presenting a perspective view of a semi-transparent ribbon with embedded street name text, the semi-transparent ribbon being laid on a street surface along a direction of a street in the panoramic view.

9. The method of claim 1, further comprising:
presenting a perspective view of a navigation indicator laid on a street surface in the panoramic view, where a user input directed to the navigation indicator causes the panoramic view to advance in a direction pointed by the navigation indicator.

10. The method of claim 1, further comprising:
receiving a notification that no panorama for the geographic location is available; and
presenting the animated sequence using a placeholder panorama in place of the panoramic view.

11. The method of claim 1, where the panoramic view is displayed on a touch-sensitive display responsive to a multi-touch gesture.

12. A non-transitory computer-readable medium having instructions stored thereon, which, when executed by at least one processor, cause the processor to perform operations comprising:
providing for display a panoramic view, the panoramic view including a view from a geographic location;
overlaying on the panoramic view an orientation indicator, the orientation indicator comprising a map that includes the geographic location, the map having a dark portion and a highlighted portion, the highlighted portion being geometrically defined by an angled wedge, wherein:

a vertex of the angled wedge corresponds to the geographic location;

the angle of the wedge opens in a direction corresponding to a field of view of the panoramic view from the geographic location; and the highlighted portion of the map displays geographic features in the highlighted portion brighter than geographic features displayed in the dark portion of the map; and in response to a change of field of view of the panoramic view, changing the opening direction or a magnitude of the angle;

wherein the orientation indicator indicates the field of view of the panoramic view such that at least one geographic feature in the highlighted portion of the map corresponds to at least one geographic feature visible in the panoramic view and at least one geographic feature in the dark portion of the map corresponds to at least one geographic feature not visible in the panoramic view.

13. The non-transitory computer-readable medium of claim 12, the operations comprising:

providing for display an animated sequence transitioning from a map view of the geographic location to the panoramic view of the geographic location, where the animated sequence comprises:

zooming into the geographic location on the map view;

transitioning from the zoomed view to the panoramic view, wherein the panoramic view has a field of view showing a street surface at the geographic location; and spinning the panoramic view such that the field of view tilts up from the street surface to a horizon.

14. The non-transitory computer-readable medium of claim 12, wherein the map and the panoramic view are both displayed in a portrait orientation, and the operations comprise receiving a user input rotating the panoramic view and the map to a landscape orientation.

15. The non-transitory computer-readable medium of claim 12, the operations comprising presenting a map view of the geographic location, wherein presenting the map view comprises:

presenting a visual indicator at the geographic location on the map; and presenting a user interface element for invoking the panoramic view of the geographic location.

16. A system comprising:

one or more processors;

memory coupled to the one or more processors and operable for storing instructions, which, when executed by the one or more processors, causes the one or more processors to perform operations comprising:

providing for display a panoramic view, the panoramic view including a view from a geographic location;

overlaying on the panoramic view an orientation indicator, the orientation indicator comprising a map that includes the geographic location, the map having a dark portion and a highlighted portion, the highlighted portion being geometrically defined by an angled wedge, wherein:

a vertex of the angled wedge corresponds to the geographic location;

the angle of the wedge opens in a direction corresponding to a field of view of the panoramic view from the geographic location; and the highlighted portion of the map displays geographic features in the highlighted portion brighter than geographic features displayed in the dark portion of the map; and in response to a change of field of view of the panoramic view, changing the opening direction or a magnitude of the angle;

wherein the orientation indicator indicates the field of view of the panoramic view such that at least one geographic feature in the highlighted portion of the map corresponds to at least one geographic feature visible in the panoramic view and at least one geographic feature in the dark portion of the map corresponds to at least one geographic feature not visible in the panoramic view.

17. The system of claim 16, the operations comprising:

providing for display an animated sequence transitioning from a map view of the geographic location to the panoramic view of the geographic location, where the animated sequence comprises:

zooming into the geographic location on the map view;

transitioning from the zoomed map view to the panoramic view, wherein the panoramic view has a field of view showing a street surface at the geographic location; and spinning the panoramic view such that the field of view tilts up from the street surface to a horizon.

18. The system of claim 16, wherein the map and the panoramic view are both displayed in a portrait orientation, and the operations comprise receiving a user input rotating the panoramic view and the map to a landscape orientation.

19. The system of claim 16, the operations comprising presenting a map view of the geographic location, wherein presenting the map view comprises:

presenting a visual indicator a the geographic location on the map; and presenting a user interface element for invoking the panoramic view of the geographic location.

* * * * *